United States Patent
Kano et al.

(10) Patent No.: US 7,680,029 B2
(45) Date of Patent: Mar. 16, 2010

(54) TRANSMISSION APPARATUS WITH MECHANISM FOR RESERVING RESOURCES FOR RECOVERY PATHS IN LABEL-SWITCHED NETWORK

(75) Inventors: Shinya Kano, Kawasaki (JP); Toshio Soumiya, Kawasaki (JP); Akira Chugo, Kawaskai (JP)

(73) Assignee: Fujitsu Limited, Kawasaki (JP)

( * ) Notice: Subject to any disclaimer, the term of this patent is extended or adjusted under 35 U.S.C. 154(b) by 1158 days.

(21) Appl. No.: 11/153,644

(22) Filed: Jun. 15, 2005

(65) Prior Publication Data

US 2005/0237927 A1 Oct. 27, 2005

Related U.S. Application Data

(63) Continuation of application No. PCT/JP03/06035, filed on May 14, 2003.

(51) Int. Cl.
*G01R 31/08* (2006.01)
(52) U.S. Cl. .................. 370/218; 370/220; 370/221; 370/228
(58) Field of Classification Search ............. 370/216, 370/217, 218, 225, 220, 221, 228, 242, 244; 709/239, 238, 242; 714/1, 2, 3, 4, 100
See application file for complete search history.

(56) References Cited

U.S. PATENT DOCUMENTS

| | | | | |
|---|---|---|---|---|
| 5,680,546 | A * | 10/1997 | Chiaretti et al. ............. 398/58 |
| 6,625,753 | B1 * | 9/2003 | Skogman et al. ............. 714/13 |
| 6,940,853 | B2 * | 9/2005 | Yamada et al. ............. 370/389 |
| 7,068,595 | B2 * | 6/2006 | Perlman et al. ............. 370/218 |
| 7,088,679 | B2 * | 8/2006 | Behzadi ..................... 370/230 |
| 7,133,358 | B2 * | 11/2006 | Kano ......................... 370/221 |
| 7,218,606 | B2 * | 5/2007 | Soumiya ..................... 370/217 |
| 7,269,135 | B2 * | 9/2007 | Frick et al. .................. 370/228 |
| 7,298,693 | B1 * | 11/2007 | Owens et al. ................ 370/216 |
| 7,315,510 | B1 * | 1/2008 | Owens et al. ................ 370/218 |
| 7,333,424 | B2 * | 2/2008 | Yamanaka et al. .......... 370/217 |
| 7,342,890 | B1 * | 3/2008 | Ferguson ..................... 370/238 |
| 7,372,806 | B2 * | 5/2008 | Suemura ..................... 370/223 |
| 7,380,017 | B2 * | 5/2008 | Weil et al. ................... 709/239 |
| 2002/0093954 | A1 * | 7/2002 | Weil et al. ................... 370/389 |
| 2002/0172149 | A1 * | 11/2002 | Kinoshita et al. ........... 370/216 |

(Continued)

FOREIGN PATENT DOCUMENTS

JP 2002-344491 11/2002

(Continued)

*Primary Examiner*—Ian N Moore
(74) *Attorney, Agent, or Firm*—Fujitsu Patent Center

(57) ABSTRACT

A recovery-path request message control block generates, sends, and receives a recovery-path request message containing failure location information and recovery-path setup information. A label assignment message control block generates, sends, and receives a label assignment message. A setup label information generation block generates setup label information. A recovery-path label table management block constructs and manages a recovery-path label table. A failure detection block detects the location of a failure. A failure notification message transfer block transfers a failure notification message containing failure location information. A recovery-path establishment block establishes a recovery-path by comparing failure location information contained in a failure notification message and failure location information contained in a recovery-path label table and by selecting setup label information corresponding to matching failure location information.

12 Claims, 39 Drawing Sheets

U.S. PATENT DOCUMENTS

| | | | |
|---|---|---|---|
| 2002/0172150 A1* | 11/2002 | Kano | 370/216 |
| 2003/0039208 A1* | 2/2003 | Soumiya | 370/216 |
| 2003/0063613 A1* | 4/2003 | Carpini et al. | 370/401 |
| 2003/0084367 A1* | 5/2003 | Suemura | 714/4 |
| 2003/0145246 A1* | 7/2003 | Suemura | 714/2 |
| 2003/0147352 A1* | 8/2003 | Ishibashi et al. | 370/248 |
| 2004/0114595 A1* | 6/2004 | Doukai | 370/389 |
| 2005/0237927 A1* | 10/2005 | Kano et al. | 370/216 |
| 2008/0095045 A1* | 4/2008 | Owens et al. | 370/220 |

FOREIGN PATENT DOCUMENTS

| | | |
|---|---|---|
| JP | 2002-344492 | 11/2002 |
| JP | 2003-060680 | 2/2003 |
| JP | 2003-124978 | 4/2003 |

* cited by examiner t1 TRANSIT LABEL TABLE

| PATH ID | INPUT IF | INPUT LABEL | OUTPUT IF | OUTPUT LABEL | MAINTENANCE PRIORITY |
|---|---|---|---|---|---|
| WORKING PATH P1-1 | IF#2 | bb | IF#1 | aa | LOW |
| WORKING PATH P1-2 | IF#1 | AA | IF#2 | BB | LOW | t2

| PATH ID | INPUT IF | INPUT LABEL | OUTPUT IF | OUTPUT LABEL | MAINTENANCE PRIORITY |
|---|---|---|---|---|---|
| WORKING PATH P1-1 | IF#2 | cc | IF#1 | bb | LOW |
| WORKING PATH P1-2 | IF#1 | BB | IF#2 | CC | LOW | t3

| PATH ID | INPUT IF | INPUT LABEL | OUTPUT IF | OUTPUT LABEL | MAINTENANCE PRIORITY |
|---|---|---|---|---|---|
| WORKING PATH P1-1 | IF#2 | dd | IF#1 | cc | LOW |
| WORKING PATH P1-2 | IF#1 | CC | IF#2 | DD | LOW | t4

| PATH ID | INPUT IF | INPUT LABEL | OUTPUT IF | OUTPUT LABEL | MAINTENANCE PRIORITY |
|---|---|---|---|---|---|
| WORKING PATH P1-1 | IF#2 | ee | IF#1 | dd | LOW |
| WORKING PATH P1-2 | IF#1 | DD | IF#2 | EE | LOW |

FIG. 4

M1　RECOVERY-PATH REQUEST MESSAGE

| MSG TYPE: REQUEST | MSG LENGTH |
|---|---|
| RECOVERY-PATH Pa1-1 ||
| DIRECTION: UPSTREAM-DOWNSTREAM ||
| HIGH | LOW | SHARED |
| OBJ TYPE: ROUTE | OBJ LENGTH |
| NODE N5 ||
| NODE N6 ||
| NODE N4 ||
| OBJ TYPE: WORKING | OBJ LENGTH |
| WORKING PATH P1-1 ||
| OBJ TYPE: FAILURE | OBJ LENGTH |
| NODE N1 ||
| IF#2 ||
| NODE N2 ||
| IF#1 ||
| NODE N2 ||
| IF#2 ||
| NODE N3 ||
| IF#1 ||
| NODE N3 ||
| IF#2 ||
| NODE N4 ||
| IF#1 ||
| LABEL "a" ||

T1a RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N1/ IF#2 | RECOVERY-PATH Pa1-1 | IF#3 | a | IF#1 | aa | HIGH | LOW |
| NODE N2/ IF#2 | RECOVERY-PATH Pa1-1 | IF#3 | a | IF#1 | aa | HIGH | LOW |
| NODE N3/ IF#2 | RECOVERY-PATH Pa1-1 | IF#3 | a | IF#1 | aa | HIGH | LOW |

M2 RECOVERY-PATH REQUEST MESSAGE

| MSG TYPE: REQUEST | MSG LENGTH |
|---|---|
| RECOVERY-PATH Pa1-1 | |
| DIRECTION: UPSTREAM-DOWNSTREAM | |

| HIGH | LOW | SHARED |
|---|---|---|

| OBJ TYPE: ROUTE | OBJ LENGTH |
|---|---|
| NODE N6 | |
| NODE N4 | |
| OBJ TYPE: WORKING | OBJ LENGTH |
| WORKING PATH P1-1 | |
| OBJ TYPE: FAILURE | OBJ LENGTH |
| NODE N1 | |
| IF#2 | |
| NODE N2 | |
| IF#1 | |
| NODE N2 | |
| IF#2 | |
| NODE N3 | |
| IF#1 | |
| NODE N3 | |
| IF#2 | |
| NODE N4 | |
| IF#2 | |
| LABEL "b" | |

FIG. 10

T2a RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N1/ IF#2 | RECOVERY-PATH Pa1-1 | IF#2 | b | IF#1 | a | HIGH | LOW |
| NODE N2/ IF#2 | RECOVERY-PATH Pa1-1 | IF#2 | b | IF#1 | a | HIGH | LOW |
| NODE N3/ IF#2 | RECOVERY-PATH Pa1-1 | IF#2 | b | IF#1 | a | HIGH | LOW |

FIG. 11

M3 RECOVERY-PATH REQUEST MESSAGE

| MSG TYPE: REQUEST | MSG LENGTH |
|---|---|
| RECOVERY-PATH Pa1-1 ||
| DIRECTION: UPSTREAM-DOWNSTREAM ||
| HIGH / LOW | SHARED |
| OBJ TYPE: ROUTE | OBJ LENGTH |
| NODE N4 ||
| OBJ TYPE: WORKING | OBJ LENGTH |
| WORKING PATH P1-1 ||
| OBJ TYPE: FAILURE | OBJ LENGTH |
| NODE N1 ||
| IF#2 ||
| NODE N2 ||
| IF#1 ||
| NODE N2 ||
| IF#2 ||
| NODE N3 ||
| IF#1 ||
| NODE N3 ||
| IF#2 ||
| NODE N4 ||
| IF#2 ||
| LABEL "c" ||

FIG. 12

T3a RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N1/ IF#2 | RECOVERY-PATH Pa1-1 | IF#2 | c | IF#1 | b | HIGH | LOW |
| NODE N2/ IF#2 | RECOVERY-PATH Pa1-1 | IF#2 | c | IF#1 | b | HIGH | LOW |
| NODE N3/ IF#2 | RECOVERY-PATH Pa1-1 | IF#2 | c | IF#1 | b | HIGH | LOW |

FIG. 13

Mr1 LABEL ASSIGNMENT MESSAGE

| MSG TYPE: ASSIGNMENT | MSG LENGTH |
|---|---|
| RECOVERY-PATH Pa1-2 | |
| LABEL "C" | |

FIG. 16

T4 RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N1/ IF#2 | RECOVERY-PATH Pa1-1 | IF#2 | ee | IF#3 | c | HIGH | LOW |
| NODE N2/ IF#2 | RECOVERY-PATH Pa1-1 | IF#2 | ee | IF#3 | c | HIGH | LOW |
| NODE N3/ IF#2 | RECOVERY-PATH Pa1-1 | IF#2 | ee | IF#3 | c | HIGH | LOW |
| NODE N2/ IF#1 | RECOVERY-PATH Pa1-2 | IF#3 | c | IF#2 | EE | HIGH | LOW |
| NODE N3/ IF#1 | RECOVERY-PATH Pa1-2 | IF#3 | c | IF#2 | EE | HIGH | LOW |
| NODE N4/ IF#1 | RECOVERY-PATH Pa1-2 | IF#3 | c | IF#2 | EE | HIGH | LOW |

FIG. 17

T3 RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N1/ IF#2 | RECOVERY-PATH Pa1-1 | IF#2 | c | IF#1 | b | HIGH | LOW |
| NODE N2/ IF#2 | RECOVERY-PATH Pa1-1 | IF#2 | c | IF#1 | b | HIGH | LOW |
| NODE N3/ IF#2 | RECOVERY-PATH Pa1-1 | IF#2 | c | IF#1 | b | HIGH | LOW |
| NODE N2/ IF#1 | RECOVERY-PATH Pa1-2 | IF#1 | B | IF#2 | c | HIGH | LOW |
| NODE N3/ IF#1 | RECOVERY-PATH Pa1-2 | IF#1 | B | IF#2 | c | HIGH | LOW |
| NODE N4/ IF#1 | RECOVERY-PATH Pa1-2 | IF#1 | B | IF#2 | c | HIGH | LOW |

FIG. 20

T2 RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N1/ IF#2 | RECOVERY-PATH Pa1-1 | IF#2 | b | IF#1 | a | HIGH | LOW |
| NODE N2/ IF#2 | RECOVERY-PATH Pa1-1 | IF#2 | b | IF#1 | a | HIGH | LOW |
| NODE N3/ IF#2 | RECOVERY-PATH Pa1-1 | IF#2 | b | IF#1 | a | HIGH | LOW |
| NODE N2/ IF#1 | RECOVERY-PATH Pa1-2 | IF#1 | A | IF#2 | B | HIGH | LOW |
| NODE N3/ IF#1 | RECOVERY-PATH Pa1-2 | IF#1 | A | IF#2 | B | HIGH | LOW |
| NODE N4/ IF#1 | RECOVERY-PATH Pa1-2 | IF#1 | A | IF#2 | B | HIGH | LOW |

T1 RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N1/ IF#2 | RECOVERY-PATH Pa1-1 | IF#3 | a | IF#1 | aa | HIGH | LOW |
| NODE N2/ IF#2 | RECOVERY-PATH Pa1-1 | IF#3 | a | IF#1 | aa | HIGH | LOW |
| NODE N3/ IF#2 | RECOVERY-PATH Pa1-1 | IF#3 | a | IF#1 | aa | HIGH | LOW |
| NODE N2/ IF#1 | RECOVERY-PATH Pa1-2 | IF#1 | AA | IF#3 | A | HIGH | LOW |
| NODE N3/ IF#1 | RECOVERY-PATH Pa1-2 | IF#1 | AA | IF#3 | A | HIGH | LOW |
| NODE N4/ IF#1 | RECOVERY-PATH Pa1-2 | IF#1 | AA | IF#3 | A | HIGH | LOW |

T5-1 RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N2/ IF#1 | RECOVERY-PATH Pa1 | IF#1 | A | IF#2 | B | HIGH | HIGH |
| NODE N3/ IF#1 | RECOVERY-PATH Pa1 | IF#1 | A | IF#2 | B | HIGH | HIGH |
| NODE N3/ IF#1 | RECOVERY-PATH Pa2 | IF#3 | C | IF#2 | B | LOW | LOW |
| NODE N4/ IF#1 | RECOVERY-PATH Pa2 | IF#3 | C | IF#2 | B | LOW | LOW |

FIG. 31 t5-1 TRANSIT LABEL TABLE

| PATH ID | INPUT IF | INPUT LABEL | OUTPUT IF | OUTPUT LABEL | MAINTENANCE PRIORITY |
|---------|----------|-------------|-----------|--------------|----------------------|
| Pa1     | IF#1     | A           | IF#2      | B            | HIGH                 |

FIG. 33

T5-1 RECOVERY-PATH LABEL TABLE

| FAILURE LOCATION INFORMATION | RECOVERY-PATH ID | INPUT IF | INPUT LABEL | OUTPUT IF | OUTPUT LABEL | ESTABLISHMENT PRIORITY | MAINTENANCE PRIORITY |
|---|---|---|---|---|---|---|---|
| NODE N2/ IF#1 | RECOVERY-PATH Pa1 | IF#1 | A | IF#2 | B | HIGH | HIGH |
| NODE N3/ IF#1 | RECOVERY-PATH Pa1 | IF#1 | A | IF#2 | B | HIGH | HIGH |
| NODE N3/ IF#1 | RECOVERY-PATH Pa2 | IF#3 | C | IF#2 | B | LOW | LOW |
| NODE N4/ IF#1 | RECOVERY-PATH Pa2 | IF#3 | C | IF#2 | B | LOW | LOW |

C3 = first two rows; C4 = last two rows t5-1 TRANSIT LABEL TABLE

| PATH ID | INPUT IF | INPUT LABEL | OUTPUT IF | OUTPUT LABEL | MAINTENANCE PRIORITY |
|---|---|---|---|---|---|
| Pa1 | IF#1 | A | IF#2 | B | HIGH |

FIG. 36

| PATH ID | INPUT IF | INPUT LABEL | OUTPUT IF | OUTPUT LABEL | MAINTENANCE PRIORITY |
|---|---|---|---|---|---|
| Pa2 | IF#3 | C | IF#2 | B | HIGH | t5-2 TRANSIT LABEL TABLE

FIG. 38

TRANSMISSION APPARATUS WITH MECHANISM FOR RESERVING RESOURCES FOR RECOVERY PATHS IN LABEL-SWITCHED NETWORK

CROSS-REFERENCE TO RELATED APPLICATION

This application is a continuing application, filed under 35 U.S.C. 111(a), of International Application PCT/JP2003/006035, filed May 14, 2003, currently pending, the contents of which are herein wholly incorporated by reference.

BACKGROUND OF THE INVENTION

1. Field of the Invention

The present invention relates to transmission apparatuses, and particularly to a transmission apparatus for performing signal transmission based on label switching while performing failure circumvention control.

2. Description of the Related Art

As the use of the Internet has been spreading, the traffic of Internet Protocol (IP) packets has been increasing in these days. The variety of contents in IP packets has also been increasing. Besides traditional computer data, an increasing amount of audio data, moving images, and other data that should be processed in real time are transmitted. Label switching in layer 2, or a technology for adding a destination label to an IP packet, receives attention under circumstances where the IP-packet transmission time should be reduced.

The label switching system is formally referred to as generalized multi-protocol label switching (GMPLS). This high-speed packet transfer technology allows different networks to be directly connected in layer 2 without using a higher layer, although internetworking was conventionally implemented in layer 3 by means of a router.

FIG. 39 shows an overview of GMPLS packet transmission. Nodes (label switch routers, or LSRs) 101 to 104 for passing a packet are connected in series by transmission media. The nodes 101 to 104 have individual label tables.

The label table contains input information IN and output information OUT. The input information IN includes an input interface identifier IFin, which is the identifier of a path to which a packet is input, and an input label Lin added to an input packet.

The output information OUT includes an output interface identifier IFout, which is the identifier of a path from which a packet should be output, and an output label Lout which should be added to an output packet. The nodes 102 and 103 have label tables ta and tb respectively, as shown in the figure.

Suppose that a packet is transferred from the node 101 to the node 104. The node 101 adds a label "a" to the packet and transfers the packet. The node 102 receives the packet having the label "a" from IFin#1 and searches through the label table ta for the corresponding output information OUT. The node 102 then replaces the label "a" with a label "b" in accordance with the output information OUT, and outputs the packet from IFout#2.

The node 103 receives the packet having the label "b" from IFin#1 and searches through the label table tb for the corresponding output information OUT. The node 103 then replaces the label "b" with a label "c" in accordance with the output information OUT, and outputs the packet from IFout#2. These steps are repeated until the packet reaches the ending node 104 in this example.

The GMPLS packet transfer performs high-speed packet transfer to a destination by determining an output interface in accordance with a label in a label table instead of an address and by rewriting the label added to the packet accordingly.

GMPLS is applied to time division multiplexing (TDM) transmission and wavelength division multiplex (WDM) transmission as well as packet transmission with a fixed-length label added at the beginning of a packet, as described above.

GMPLS applied to TDM does not add a label to data and uses a time slot as a label. In a synchronous optical network (SONET), for instance, channels are multiplexed by interchanging time slots, so that routing is determined by identifying the time slots.

GMPLS applied to WDM transmission uses an optical wavelength as a label. Switching is performed by identifying a wavelength as a label, and the optical signal is directly routed.

In an optical network where a rapidly increasing volume of communication traffic flows, a line disconnection, a node failure, or any other failure causes serious damage to service. Accordingly, a high-level failure recovery system is desperately needed. If a failure occurs in a GMPLS network, the working path is switched to a recovery-path so that the failure can be circumvented. This raises interest in flexible design of a recovery-path.

A conventional network failure circumvention system sends a path setup request message for the working path, containing the need or no need of protection, from the inlet node through the working path to the outlet node. When the response is sent back, the nodes automatically determine the route of a recovery-path. (See Japanese Unexamined Patent Application Publication No. 2002-344491 (paragraph numbers 0012 to 0023, FIG. 3), for instance).

The conventional system (disclosed in Japanese Unexamined Patent Publication No. 2002-344491) automatically routes the recovery-path, starting from a node on a working path when the working path is set up. If a plurality of recovery-paths is set up, the nodes cannot immediately establish a recovery-path best for the location of a failure because a section for determining the recovery-path to be selected is not provided.

SUMMARY OF THE INVENTION

In view of the foregoing, it is an object of the present invention to provide a transmission apparatus which can circumvent a failure by establishing an efficient recovery-path at a high speed and can improve the transmission quality and the reliability.

To accomplish the above object, according to the present invention, there is provided a transmission apparatus for performing signal transmission based on label switching while performing failure circumvention control. This transmission apparatus includes the following elements: a label distribution control block, a recovery-path label table management block, a failure notification block, and a recovery-path establishment block. The label distribution control block includes a recovery-path request message control block for generating, sending, and receiving a recovery-path request message which contains failure location information indicating a location where a failure can occur on a working path of a network and recovery-path setup information used to set up a recovery-path for failure recovery; a label assignment message control block for generating, sending, and receiving a label assignment message as a response to the recovery-path request message; and a setup label information generation block for generating setup label information necessary for performing label switching in accordance with the recovery-path request message and the label assignment message. The recovery-path label table management block constructs and manages a recovery-path label table containing failure location information and setup label information. The failure notification block includes a failure detection block for detecting the location of any failure; and a failure notification message transfer block for transferring a failure notification message containing the failure location information of the failure. The recovery-path establishment block establishes a recovery-path by comparing the failure location information contained in the failure notification message and the failure location information contained in the recovery-path label table and by selecting setup label information corresponding to any matching failure location information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows transit label tables.
FIG. 7 shows the format of a recovery-path request message.
FIG. 8 shows a recovery-path label table.
FIG. 10 shows the format of a recovery-path request message.
FIG. 11 shows a recovery-path label table.
FIG. 12 shows the format of a recovery-path request message.
FIG. 13 shows a recovery-path label table.
FIG. 16 shows the format of a label assignment message.
FIG. 17 shows a recovery-path label table.
FIG. 20 shows a recovery-path label table.
FIG. 22 shows a recovery-path label table.
FIG. 24 shows a recovery-path label table.
FIG. 31 shows a recovery-path label table provided in a node.
FIG. 33 shows a transit label table.

FIG. 36 shows a recovery-path label table and a transit label table.
FIG. 38 shows a transit label table.

DESCRIPTION OF THE PREFERRED EMBODIMENTS

Figure 1:
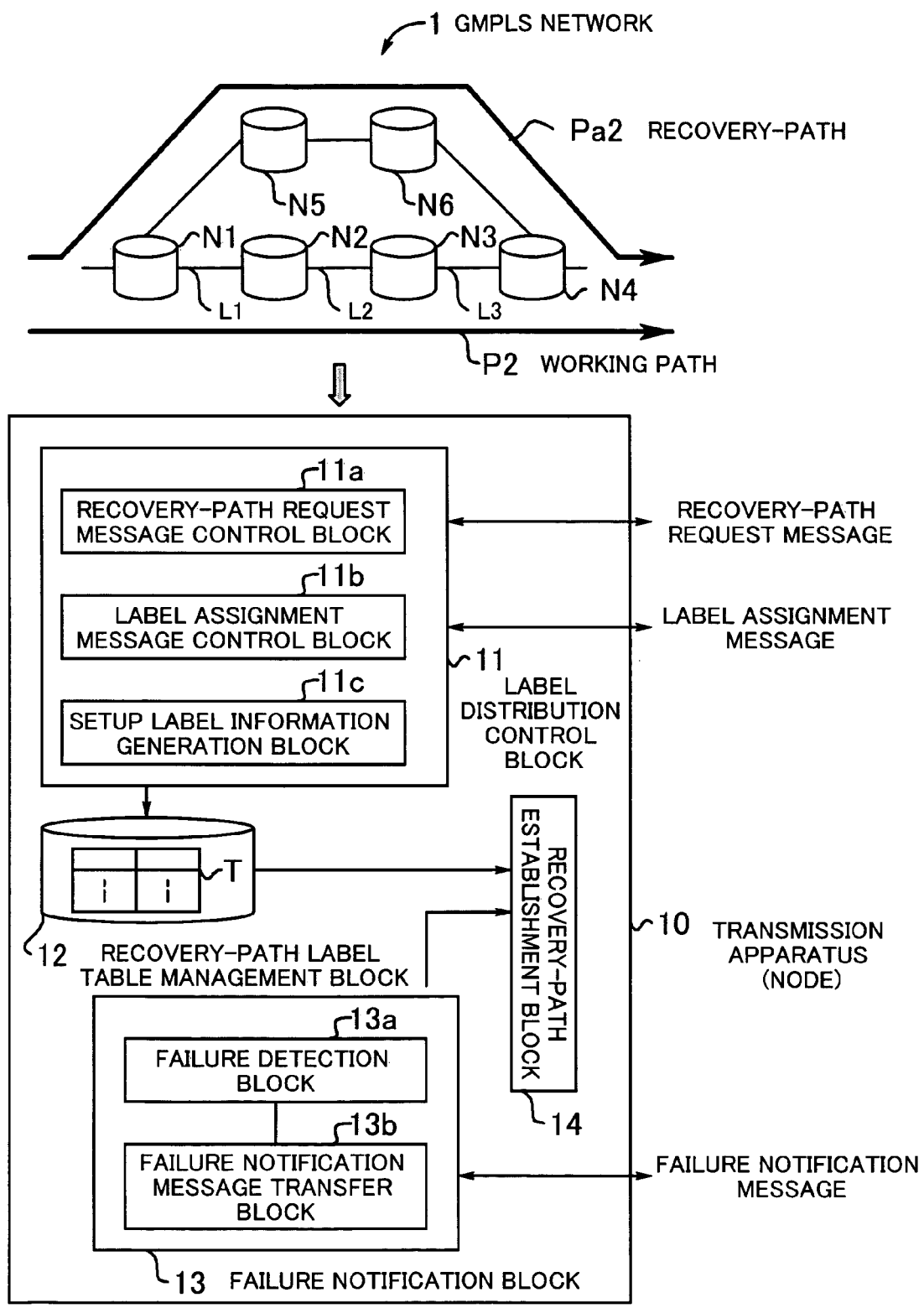
FIG. 1 shows an overview of a transmission apparatus according to the present invention.

An embodiment of the present invention will be described below with reference to the drawings. FIG. 1 shows an overview of a transmission apparatus according to the present invention. A transmission apparatus (node) 10 includes a label distribution control block 11, a recovery-path label table management block 12, a failure notification block 13, and a recovery-path establishment block 14. The transmission apparatus 10 performs signal transmission based on GMPLS label switching while performing failure circumvention control. All nodes N1 to N6 included in a GMPLS network 1 have the functions of the transmission apparatus 10.

The label distribution control block 11 has a recovery-path request message control block 11a, a label assignment message control block 11b, and a setup label information generation block 11c. The label distribution control block 11 distributes a label among nodes under a label distribution protocol, such as the constraint-based routing using label distribution protocol (CR-LDP), which will be described later.

The recovery-path request message control block 11a generates, sends, and receives a recovery-path request message containing failure location information which indicates a location where a failure can occur on the working path of the network and recovery-path setup information required to set up a recovery-path for failure recovery.

The failure location information includes a failure node identifier, a failure link identifier, and others. In FIG. 1, the failure location information of a working path P2 includes the identifiers of links L1 to L3. A recovery-path Pa2 is used for recovery from any failure which occurs therein.

The recovery-path setup information includes the identifier of a recovery-path, the direction of the recovery-path, transit node information, and others. The label assignment message control block 11b generates, sends, and receives a label assignment message as a response to the recovery-path request message.

The setup label information generation block 11c generates setup label information required for performing label switching, based on the recovery-path request message and the label assignment message. The setup label information contains input information, output information, establishment priority, and maintenance priority. The input information includes an input interface identifier (input IF), which is the identifier of a path to which data is input, and an input label of the input data. The output information includes an output interface identifier (output IF), which is the identifier of a path from which data should be output, and an output label of the output data. The establishment priority indicates establishment precedence given to a plurality of recovery-paths. The maintenance priority indicates maintenance precedence given to a plurality of recovery-paths. The establishment priority and maintenance priority will be described later with reference to FIG. 29.

The recovery-path label table management block 12 constructs and manages a recovery-path label table T containing failure location information and setup label information. The failure notification block 13 includes a failure detection block 13a and a failure notification message transfer block 13b. The failure detection block 13a detects the location of any failure. The failure notification message transfer block 13b transfers a failure notification message containing relative failure location information.

The recovery-path establishment block 14 compares the failure location information contained in a failure notification message and the failure location information contained in the recovery-path label table T, finds any matching failure location information, selects setup label information corresponding to the matching failure location information, and establishes a recovery-path accordingly.

The present invention can be applied to any GMPLS transmission of packet transmission, TDM transmission, and WDM transmission. The operation of packet transmission will be described here mainly. "To set up a path" here means "to reserve a resource for providing a path between nodes." "To establish a path" here means "to make a path active." When a recovery-path is "established," the recovery-path becomes a working path.

Figure 2:
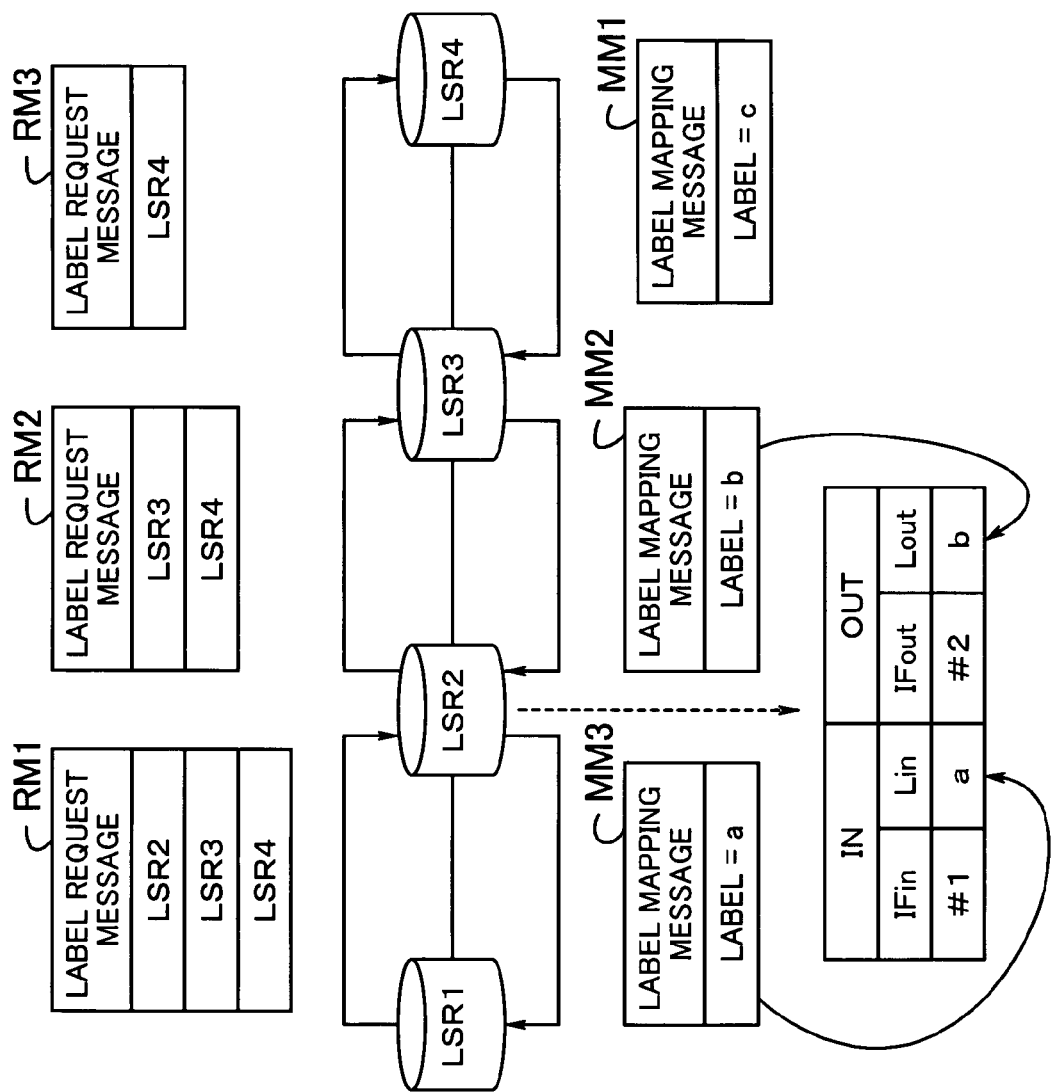
FIG. 2 shows an overview of constraint-based routing using label distribution protocol (CR-LDP).

The CR-LDP for generating a label table will next be described. The basic operation under RSVP-TE is the same as that under CR-LDP. FIG. 2 shows an overview of the CR-LDP. Suppose that a GMPLS label switched path (LSP) is established from a label switch router LSR1 through LSR2 and LSR3 to LSR4.

A source label switch router which makes a request to establish a path sends a label request message specifying a route or transit label switch routers to a destination label switch router on a hop-by-hop basis to the destination label switch router. The destination label switch router returns a label mapping message for assigning a label to the source label switch router.

In the example shown in FIG. 2, the source label switch router LSR1 sends a label request message RM1 specifying the transit label switch routers LSR2 and LSR3 and the destination label switch router LSR4, to the label switch router LSR2. The label switch router LSR2 sends a label request message RM2 specifying the transit label switch router LSR3 and the destination label switch router LSR4, to the label switch router LSR3. The label switch router LSR3 sends a label request message RM3 specifying the destination label switch router LSR4, to the label switch router LSR4.

The destination label switch router LSR4 sends a label mapping message MM1 containing the information of a label "c" to the label switch router LSR3. At the reception of the label mapping message, the label switch router LSR3: adds the label "c" to a packet which should be output from the corresponding output interface. The label switch router LSR3 sends a label mapping message MM2 containing the information of a label "b" to the label switch router LSR2. At the reception of the label mapping message, the label switch router LSR2 adds the label "b" to a packet which should be output from the corresponding output interface. The label switch router LSR2 sends a label mapping message MM3 containing the information of a label "a" to the source label switch router LSR1. At the reception of the label mapping message, the label switch router LSR1 adds the label "a" to a packet which should be output from the corresponding output interface. Through these operations, each label switch router generates a label table. The label request message corresponds to a recovery-path request message in the transmission apparatus 10 according to the present invention, and the label mapping message corresponds to a label assignment message.

Figure 3:
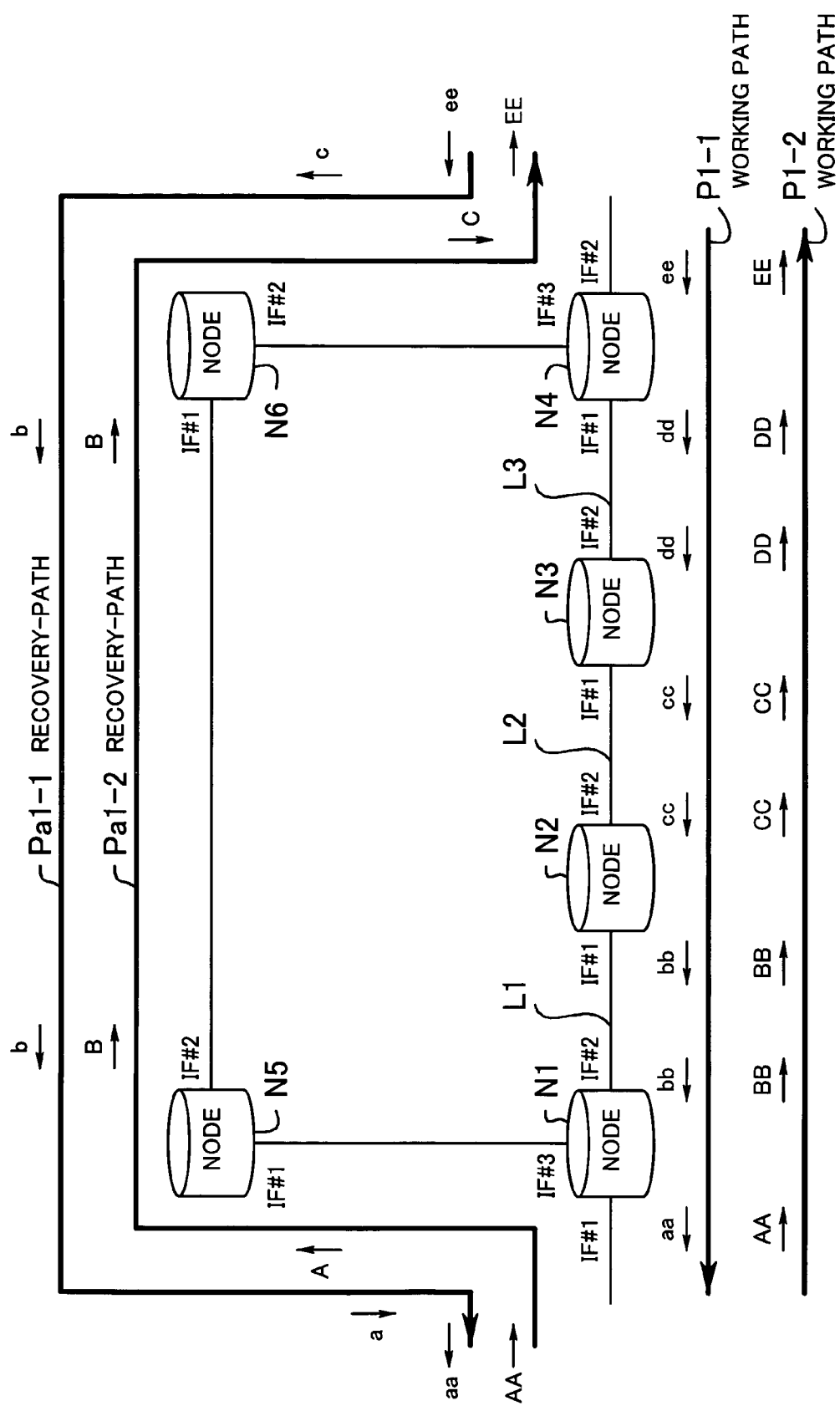
FIG. 3 shows a network where labels are distributed.

The operation for setting up a recovery-path, including the generation of a recovery-path label table T will next be described in detail. FIG. 3 shows the whole network after labels are distributed. Some subsequent drawings show the process of label distribution until the network shown in FIG. 3 is constructed.

FIG. 3 shows the network where the labels have been distributed. The network has nodes N1 to N6: The nodes N1 to N4 are connected in series, and nodes N5 and N6 are connected to the nodes N1 and N4 respectively. A working path P1-1 has been established from the node N4 through the nodes N3 and N2 to the node N1. Another working path P1-2 has been established from the node N1 through the nodes N2 and N3 to the node N4.

The figure shows, for instance, that when a packet with a label bb is received from the input interface IF#2 on the working path P1-1, the node N1 outputs the packet from the output interface IF#1 with the label bb replaced by a label aa. Symbols specified around the nodes in the figure have the same meanings as those described above.

The opposite working paths P1-1 and P1-2 correspond to recovery-paths Pa1-1 and Pa1-2 respectively. The recovery-path Pa1-1 passes through the nodes N4, N6, N5, and N1 in that order, and the recovery-path Pa1-2 passes thorough the nodes N1, N5, N6, and N4 in that order.

The figure shows, for instance, that when a packet with a label "b" is received from the input interface IF#2 on the recovery-path Pa1-1, the node N5 outputs the packet from the output interface IF#1 with the label "b" replaced by a label "a" When a packet with a label "A" is received from the input interface IF#1 on the recovery-path Pa1-2, the node N5 outputs the packet from the output interface IF#2 with the label "A" replaced by a label "B".

Label tables related to the working paths P1-1 and P1-2 will next be described. A label table related to a working path will be referred to as a transit label table. FIG. 4 shows transit label tables. The nodes N1 to N4 have transit label tables t1 to t4 respectively. The transit label tables t1 to t4 have the following items: a path identifier, an input interface, an input label, an output interface, and an output label.

In the transit label table t1 of the node N1, for instance, the working path P1-1 is associated with the input interface IF#2, the input label bb, the output interface IF#1, and the output label aa. When a packet with the label bb is input from the interface IF#2, the packet is output from the interface IF#1 with the label replaced by the label aa.

The working path P1-2 is associated with the input interface IF#1, the input label AA, the output interface IF#2, and the output label BB. When a packet with the label AA is input from the interface IF#1, the packet is output from the interface IF#2 with the label replaced by the label BB. The other transit label tables t2 and t4 indicate like operations.

Figure 5:
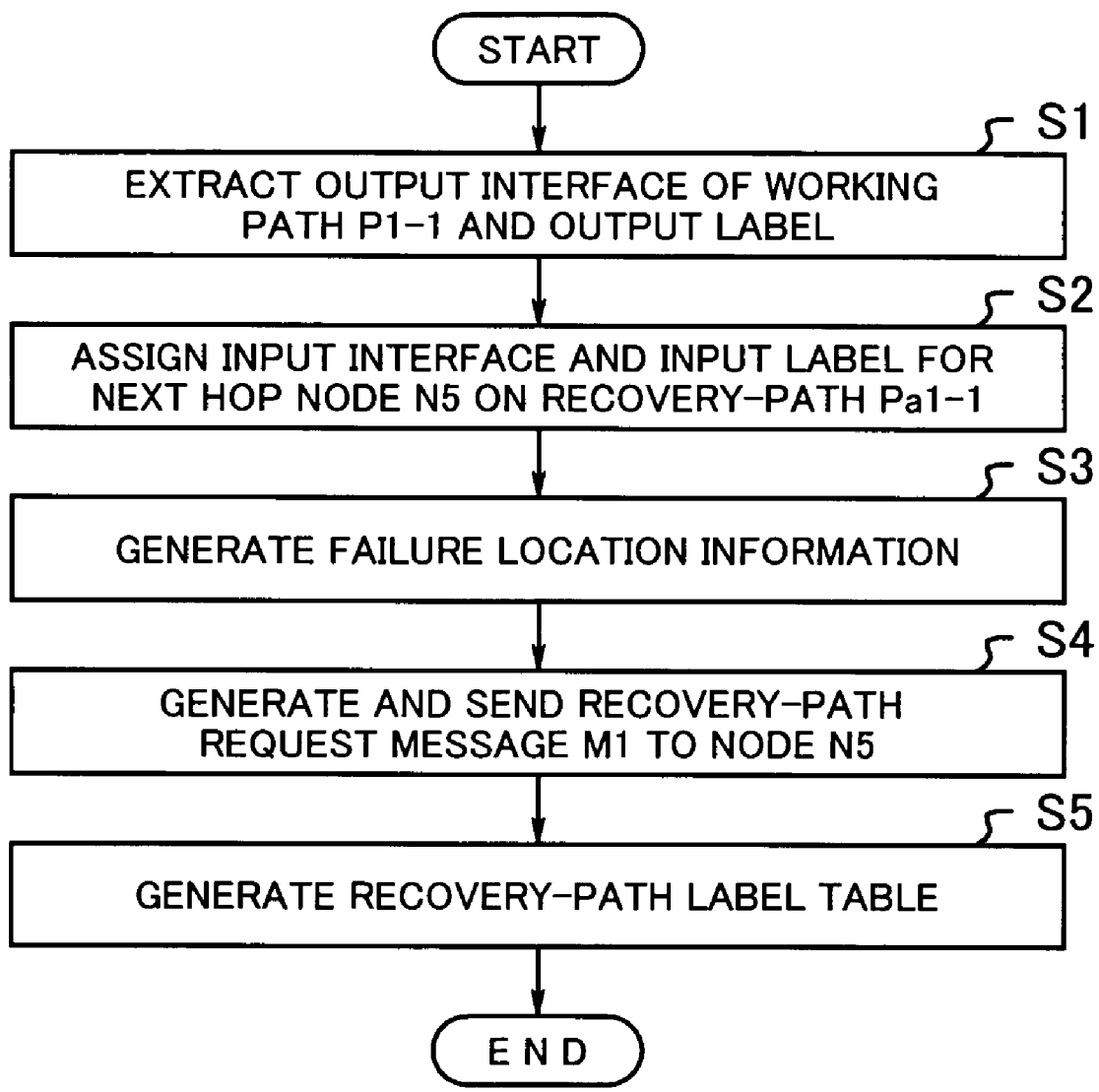
FIG. 5 is a flow chart showing the operation of a node.

The process of generating a recovery-path label table required to set up the recovery-paths Pa1-1 and Pa1-2 shown in FIG. 3 will next be described in detail. FIG. 5 is a flow chart showing the operation of the node N1.

Step S1: The node N1 is a node where a working path and a recovery-path meet. The setup label information generation block 11c in the node N1 must associate the output interfaces of the working path P1-1 and the output labels with the input interfaces of the recovery-path Pa1-1 and the input labels, so that the working path P1-1 and the recovery-path Pa1-1 are linked. So, an output interface IF#1 of the working path P1-1 and an output label aa are extracted from the transit label table t1.

Step S2: The setup label information generation block 11c sets an interface connecting to the next hop node N5 on the recovery-path Pa1-1 to an input interface IF#3, and assigns a new input label "a" to the input interface IF#3.

Step S3: The recovery-path request message control block 11a generates failure location information indicating a location where a failure can occur on the working path P1-1, in accordance with an external instruction (recovery-path request instruction) given by the operator. A failure on the working path P1-1 can occur in the links L1 to L3, shown in FIG. 3. So, the failure location information includes the output interfaces of the nodes N1, N2, and N3 (IF#2 of the node N1, IF#2 of the node N2, and IF#2 of the node N3).

A failure on the working path P1-2 can occur in the links L1 to L3, shown in FIG. 3. So, the failure location information includes the input interfaces of the nodes N2, N3, and N4 (IF#1 of the node N2, IF#1 of the node N3, and IF#1 of the node N4).

Step S4: The recovery-path request message control block 11a sends a recovery-path request message M containing recovery-path setup information and the failure location information obtained in the step S3, to the next hop node or the node N5 on the recovery-path Pa1-1. The detailed format of the recovery-path request message M1 will later be described with reference to FIG. 7.

Step S5: The recovery-path label table management block 12 generates a recovery-path label table by adding the failure location information for the working path P1-1 and the setup label information corresponding to the failure location information to a label table.

In step S4, the recovery-path request message control block 11a can add a share flag indicating whether the same resource is shared, to the recovery-path request message M1. If a recovery-path request message is sent with a share flag set ON, a newly assigned label is shared with another recovery-path. With such control, a plurality of recovery-paths can share a reserved resource, and reserved resources can be efficiently used.

Figure 6:
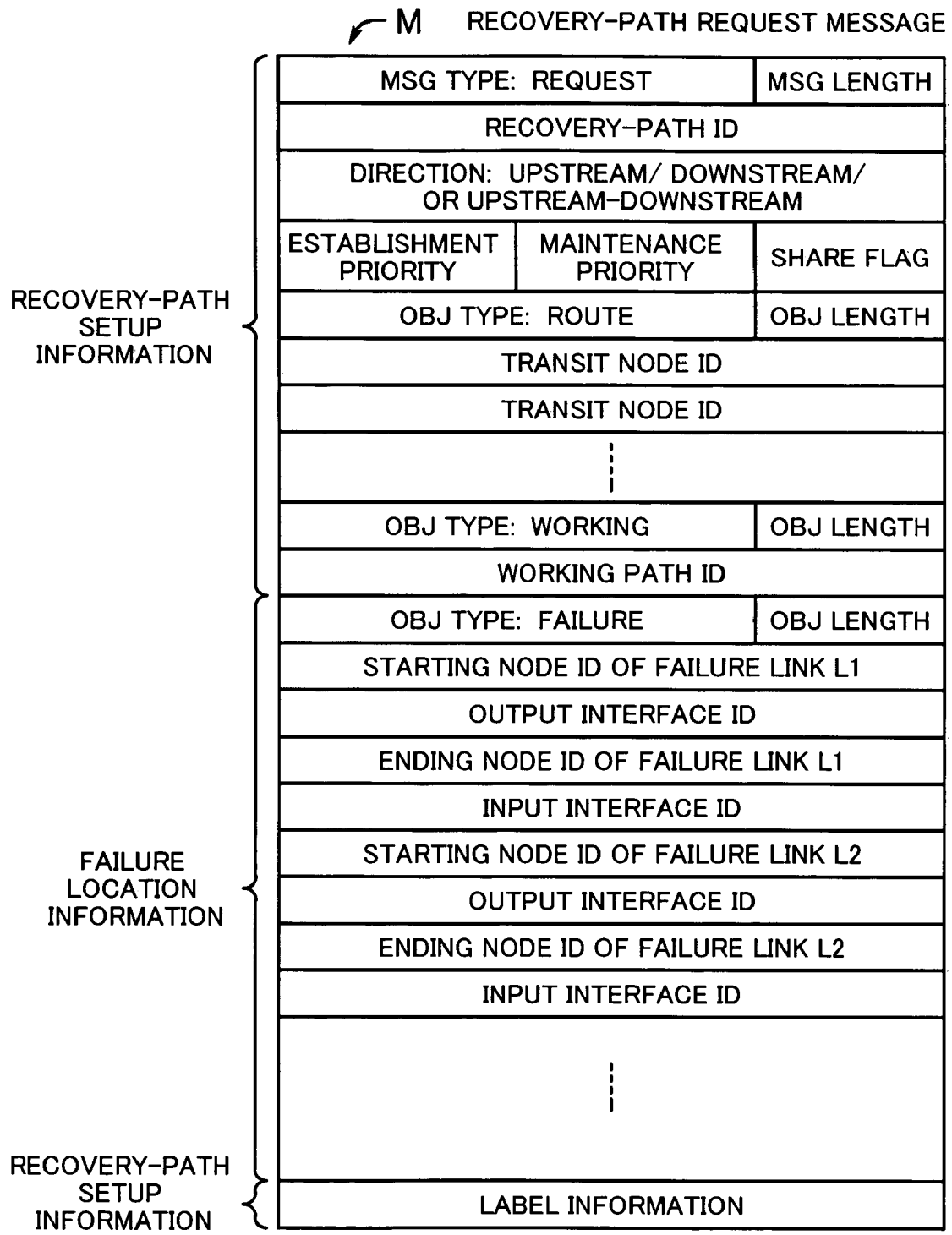
FIG. 6 shows a basic format of a recovery-path request message.

FIG. 6 shows a basic format of a recovery-path request message. FIG. 7 shows the format of the recovery-path request message M1. The recovery-path request message M1 has some fields. An MSG type field indicates a message type, and the message M1 is of a request type. An MSG; length field indicates the message length. A recovery-path. ID field of the message M1 is set to recovery-path Pa1-1.

A direction field specifies upstream, downstream, or upstream-downstream. The direction field of the message M1 is set to upstream-downstream. An establishment priority field, a maintenance priority field, and a share flag field are set to high, low, and shared respectively. An OBJ type field indicates an object type, and an OBJ length field indicates the object length. If the OBJ type is route, transit node information is described therebelow. The transit node information of the message M1 includes the node N5, the node N6, and the node N4.

If the OBJ type is working, a working path ID is described therebelow as working path information. The working path information of the message M1 is working path P1-1. If the OBJ type is failure, failure location information is described therebelow. The failure location information of the message M1 includes all the failure location information of the working paths P1-1 and P1-2, such as node N1 as the starting node identifier of the link L1, the output interface identifier IF#2, node N2 as the ending node identifier of the link L1, and the input interface identifier IF#1. The other failure location information is described in the same way. The last field contains label information, and the label information field of the message M1 contains the label "a".

FIG. 8 shows a recovery-path label table. To be more specific, the figure shows the recovery-path label table T1a generated by the node N1 on the recovery-path Pa1-1 in step S5 described above. The recovery-path label table T1a contains the following data: failure location information, a recovery-path identifier, an input interface, an input label, an output interface, an output label, establishment priority, and maintenance priority.

In the shown table, the input interface is IF#3, the input label is "a", the output interface is IF#1, the output label is aa, the establishment priority is high, and the maintenance priority is low, for all failure location information items.

This means that if a failure occurs in IF#2 of the node N1, IF#2 of the node N2, or IF#2 of the node N3, a packet input from IF#3 with the label "a" added is output from IF#1 with the label replaced by the label aa extracted from the transit label table t1. The establishment priority and the maintenance priority will be described later.

Figure 9:
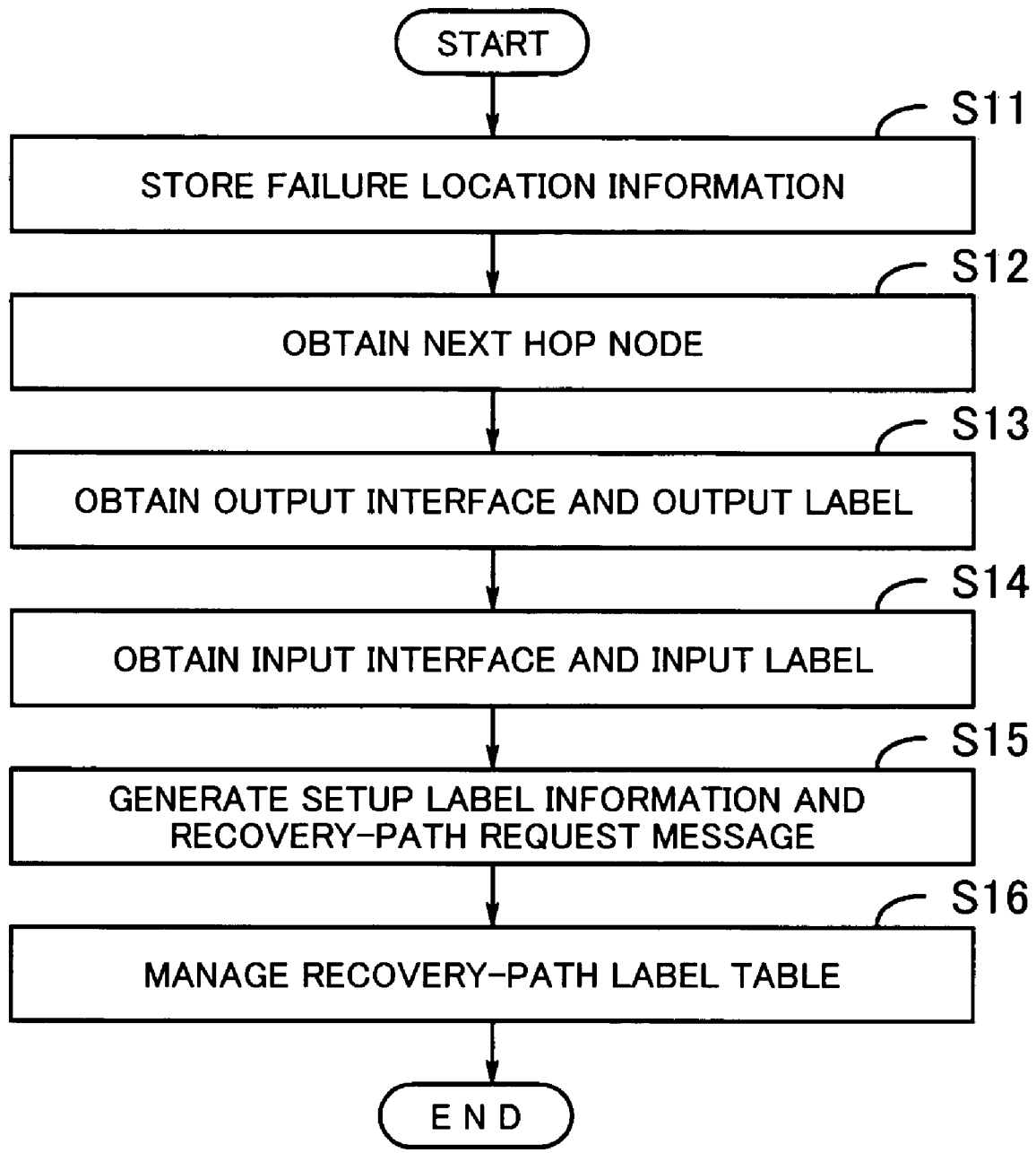
FIG. 9 is a flow chart showing the operation of a node.

The operation of the node N5 after receiving the recovery-path request message M1 will next be described. FIG. 9 is a flow chart showing the operation of the node N5.

Step S11: The recovery-path request message control block 11a of the node N5 stores the failure location information contained in the recovery-path request message M1. The label distribution control block 11 stores the node N1, which has sent the recovery-path request message M1, in order to send a label assignment message back to the node N1 as a response.

Step S12: The recovery-path request message control block 11a obtains the next hop node N6 in accordance with the transit node information of the recovery-path Pa1-1 contained in the recovery-path request message M1.

Step S13: If the recovery-path request message M1 contains label information, the setup label information generation block 11c sets an interface connecting to the node N1, which has sent the recovery-path request message M1, to an output interface IF#1, and assigns the label "a" contained in the recovery-path request message M1 as an output label to the output interface IF#1.

Step S14: If the recovery-path request message M1 contains label information, the setup label information generation block 11c sets an interface connecting to the node N6 to which a recovery-path request message M2 should be sent, to an input interface IF#2, and assigns a new input label "b" to the input interface IF#2. If a share flag is set, a newly assigned input label is shared with another recovery-path.

Step S15: The setup label information generation block 11c associates the input interface, the input label, the output interface, and the output label with the failure location information. If the recovery-path request message M1 contains establishment priority or maintenance priority, the setup label information generation block 11c generates setup label information including those information items. The recovery-path request message control block 11a generates and sends a recovery-path request message M2 to the node N6.

Step S16: The recovery-path label table management block 12 generates a recovery-path label table which includes the setup label information.

FIG. 10 shows the format of the recovery-path request message M2. The nodes N6 and N4 are included as the transit node information, and the label "b" is included as the label information, in the message M2.

FIG. 11 shows a recovery-path label table. To be more specific, the figure shows the recovery-path label table T2a generated by the node N5 in step S16 described above. The recovery-path label table T2a of the recovery-path Pa1-1 contains the following data: failure location information, a recovery-path identifier, an input interface, an input label, an output interface, an output label, establishment priority, and maintenance priority.

In the shown table, the input interface is IF#2, the input label is "b", the output interface is IF#1, the output label is "a", the establishment priority is high, and the maintenance priority if low, for all failure location information items.

This means that if a failure occurs in IF#2 of the node N1, IF#2 of the node N2, or IF#2 of the node N3 in the working path P1-1, a packet input from IF#2 with the label "b" added is output from IF#1 with the label replaced by the label "a".

FIG. 12 shows a recovery-path request message sent from the node N6 to the node N4. FIG. 13 shows a recovery-path label table managed by the node N6. Since the basic operation of the node N6 is the same as that of the node N5 shown in FIG. 9, a description thereof is omitted.

FIG. 12 shows the format of the recovery-path request message. In the recovery-path request message M3 sent from the node N6 to the node N4, the node N4 is included as the transit node information, and a label "c" is included as the label information.

FIG. 13 shows a recovery-path label table. To be more specific, the figure shows the recovery-path label table T3a generated and managed by the node N6 after the recovery-path request message M2 is received. The recovery-path label table T3a contains the following data: failure location information, a recovery-path identifier, an input interface, an input label, an output interface, an output label, establishment priority, and maintenance priority.

In the shown table, the input interface is IF#2, the input label is "c", the output interface is IF#1, the output label is "b", the establishment priority is high, and the maintenance priority is low, for all failure location information items.

This means that if a failure occurs in IF#2 of the node N1, IF#2 of the node N2, IF#2 of the node N3 in the working path P1-1, a packet input from IF#2 with the label "c" added is output from IF#1 on the recovery-path Pa1-1 with the label replaced by the label "b".

Figure 14:
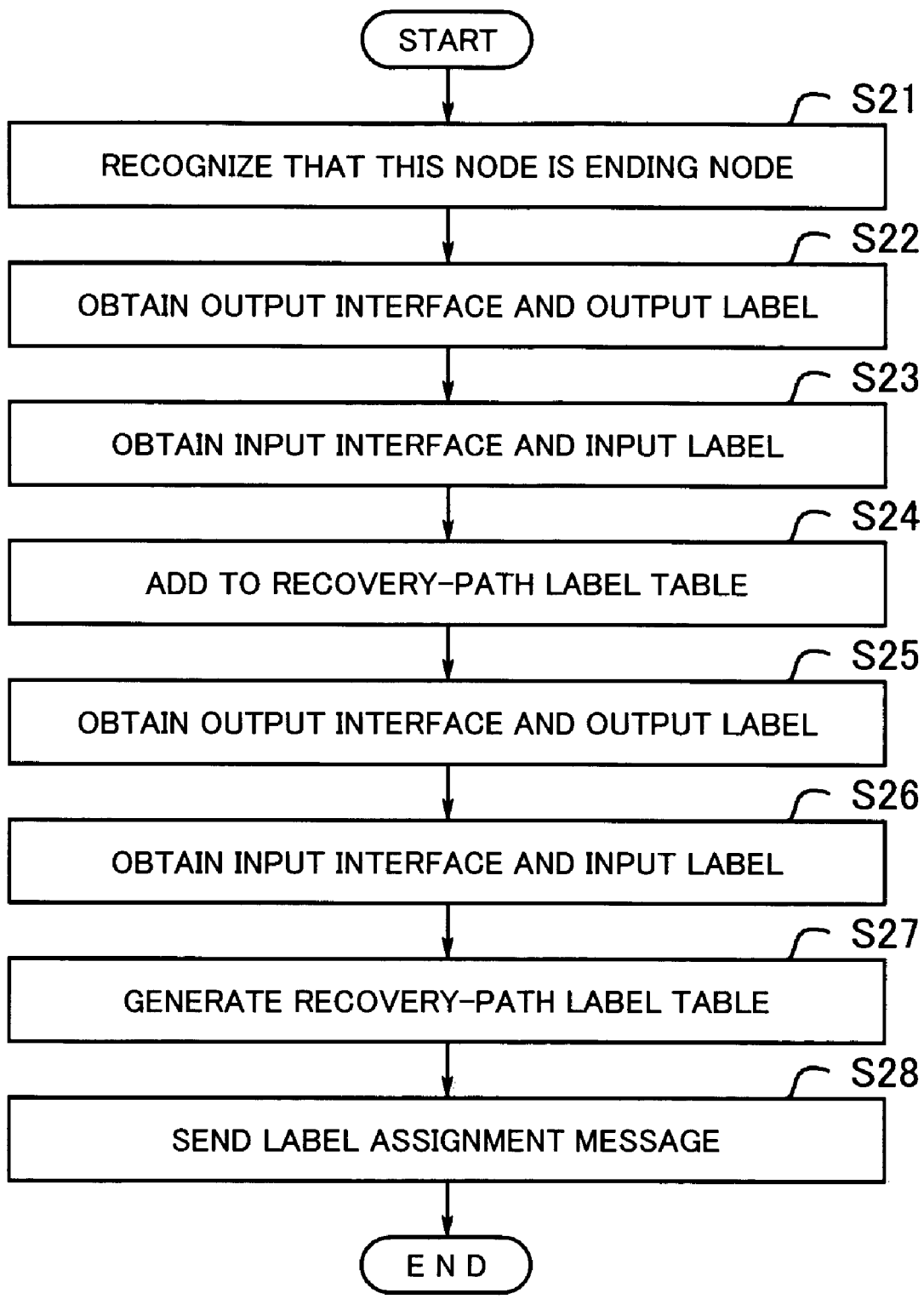
FIG. 14 is a flow chart showing the operation of a node.

The operation of the node N4 receiving the recovery-path request message M3 will next be described. FIG. 14 is a flow chart showing the operation of the node N4.

Step S21: The recovery-path request message control block 11a of the node N4 obtains the next hop node in accordance with the transit node information of the recovery-path contained in the recovery-path request message M3. Because the message M3 contains just this node N4 as the transit node information, the recovery-path request message control block 11a recognizes that this node is an ending node.

Step S22: If the recovery-path request message M3 contains label information, the setup label information generation block 11c sets an interface connecting to the node N6, which has sent the recovery-path request message M3, to an output interface IF#3, and assigns the label "c" contained in the message M3 as an output label to the output interface IF#3.

Step S23: If the recovery-path request message M3 contains label information and if this node is an ending node, the setup label information generation block 11c extracts an input label and an input interface corresponding to the working path ID P1-1 contained in the message M3, from the transit label table. That is, the input interface IF#2 and the input label ee corresponding to the working path P1-1 are extracted from the transit label table t4 shown in FIG. 4.

Step S24: The setup label information generation block 11c adds the input interface, the input label, the output interface, and the output label to the label table, in association with the failure location information.

Step S25: If this node is an ending node and if the direction of the recovery-path is upstream-downstream, the setup label information generation block 11c extracts the output interface and the output label corresponding to the working path P1-2, from the transit label table. That is, the output interface IF#2 and the output label EE corresponding to the working path P1-2 are extracted from the transit label table t4 shown in FIG. 4.

Step S26: If this node is an ending node and if the direction of the recovery-path is upstream-downstream, the setup label information generation block 11c sets an interface connecting to the node N6, which has sent the recovery-path request message M3, to an input interface IF#3, and assigns a new input label "C" to the input interface IF#3. If a share flag is set, the newly assigned input label is shared with another recovery-path.

Step S27: The setup label information generation block 11c adds the input interface, the input label, the output interface, and the output label to the label table, in association with the failure location information. If the recovery-path request message M3 contains establishment priority or maintenance priority, the information items are also included in the recovery-path label table to be generated. The recovery-path label table management block 12 manages the table.

Step S28: The label assignment message control block 11b sends a label assignment message Mr1 to the node N6.

Figure 15:
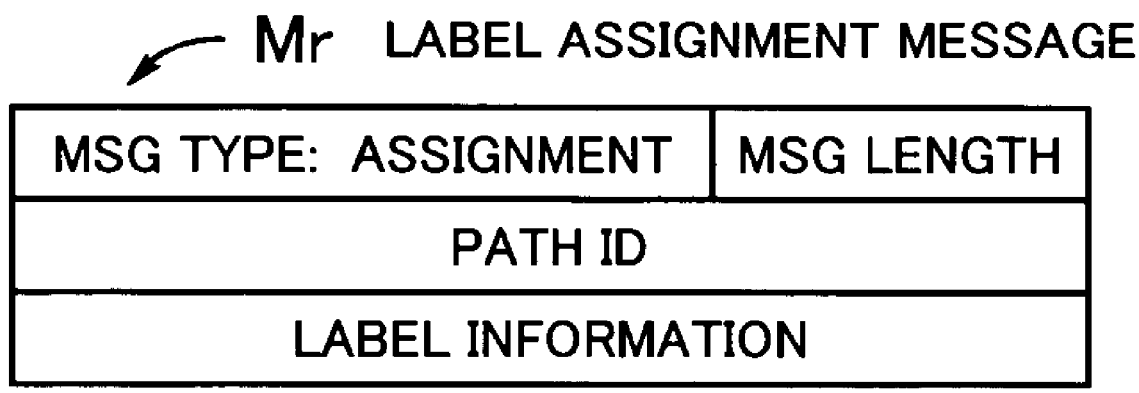
FIG. 15 shows a basic format of a label assignment message.

FIG. 15 shows a basic format of a label assignment message. FIG. 16 shows the format of the label assignment message Mr1. The label assignment message Mr1 has some fields. The MSG type field indicates a message type, and the message Mr1 is of an assignment type. The MSG length field indicates the message length. The path identifier field is set to the recovery-path Pa1-2, and a label information field is set to a label "C".

FIG. 17 shows a recovery-path label table. To be more specific, the figure shows a recovery-path label table T4 generated by the node N4 in step S27. The recovery-path label table T4 contains the following data: failure location information, a recovery-path identifier, an input interface, an input label, an output interface, an output label, establishment priority, and maintenance priority.

In the shown table, the input interface is IF#2, the input label is ee, the output interface is IF#3, the output label is "c", the establishment priority is high, and the maintenance priority is low, for all failure location information items related to the recovery-path Pa1-1.

This means that if a failure occurs in IF#2 of the node N1, IF#2 of the node N2, or IF#2 of the node N3 of the working path P1-1, a packet input from IF#2 with the label ee added is output from IF#3 with the label replaced by the label "c".

In the shown table, the input interface is IF#3, the input label is "C", the output interface is IF#2, the output label is EE, the establishment priority is high, and the maintenance priority is low, for all failure location information items related to the recovery-path Pa1-2.

This means that if a failure occurs in IF#1 of the node N2, IF#1 of the node N3, or IF#1 of the node N4 of the working path P1-2, a packet input from IF#3 with the label "C" added is output from IF#2 with the label replaced by the label EE.

Figure 18:
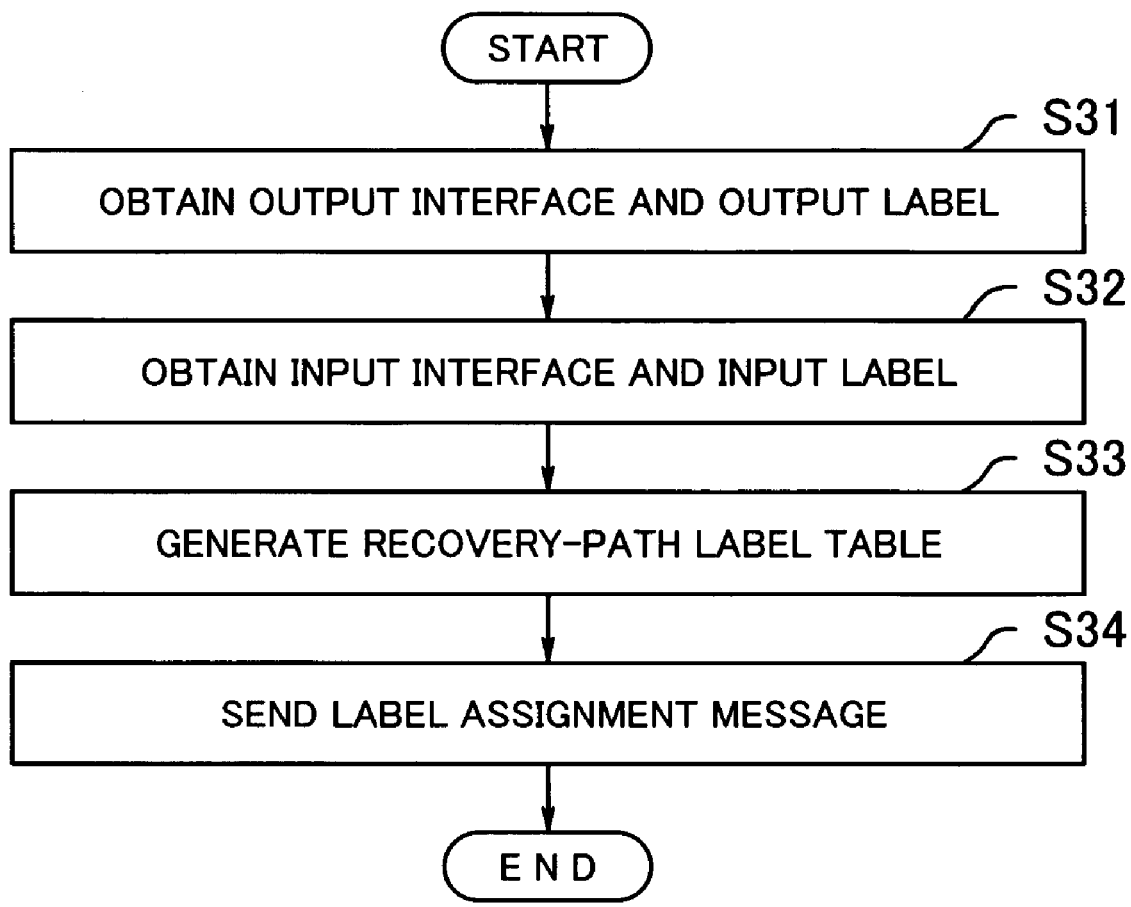
FIG. 18 is a flow chart showing the operation of a node.

The operation of the node N6 receiving the label assignment message Mr1 will next be described. FIG. 18 is a flow chart showing the operation of the node N6.

Step S31: The label assignment message control block 11b of the node N6 receives the label assignment message Mr1. The setup label information generation block 11c sets an interface connecting to the node N4, which has sent the label assignment message Mr1, to an output interface IF#2, and assigns the label "C" contained in the label assignment message Mr1 as an output label to the output interface IF#2.

Step S32: The setup label information generation block 11c sets an interface connecting to the node N5, which has sent the recovery-path request message M2, to an input interface IF#1, and assigns a new input label "B" to the input interface IF#1. If a share flag is set, the newly assigned input label is shared with another recovery-path.

Step S33: The setup label information generation block 11c adds the input interface, the input label, the output interface, and the output label to a label table, in association with the failure location information. If the recovery-path request message M2 contains establishment priority or maintenance priority, those information items are also added to the label table. The recovery-path label table management block 12 creates a recovery-path label table of the opposite recovery-paths Pa1-1 and Pa1-2 by incorporating the recovery-path label table T3a shown in FIG. 13, and manages the table.

Step S34: The label assignment message control block 11b sends a label assignment message Mr2 to the node N5, which has sent the recovery-path request message M2.

Figure 19:
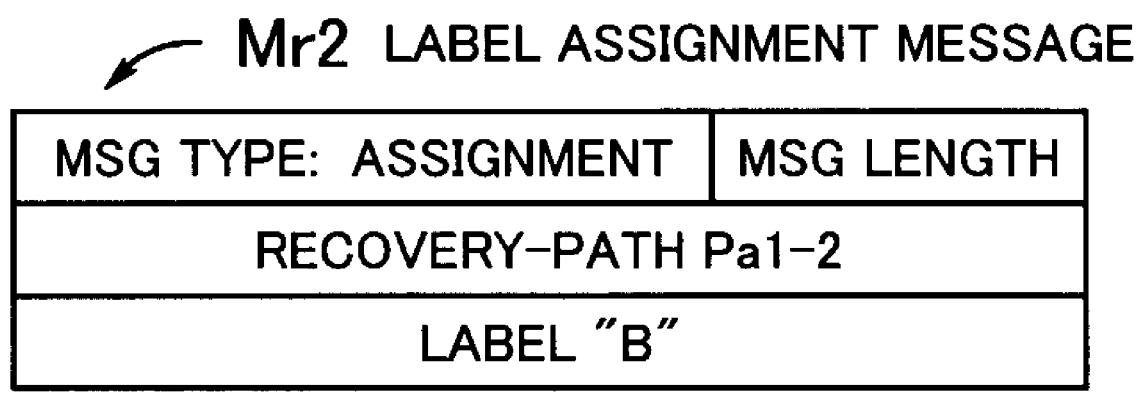
FIG. 19 shows the format of a label assignment message.

FIG. 19 shows the format of the label assignment message Mr2. In the message Mr2, the path identifier field is set to the recovery-path Pa1-2, and the label information field is set to the label B.

FIG. 20 shows a recovery-path label table. To be more specific, the figure shows the recovery-path label table T3 generated by the node N6 in step S33 described above. The recovery-path label table T3 contains the following data: failure location information, a recovery-path identifier, an input interface, an input label, an output interface, an output label, establishment priority, and maintenance priority.

In the shown table, the input interface is IF#1, the input label is "B", the output interface is IF#2, the output label is "C", the establishment priority is high, and the maintenance priority is low, for all failure location information items related to the recovery-path Pa1-2. (The setup label information for the failure location information of the recovery-path Pa1-1 was described with reference to FIG. 13.)

This means that if a failure occurs in IF#1 of the node N2, IF#1 of the node 3, or IF#1 of the node N4 of the working path P1-2, a packet input from IF#1 with the label "B" added is output from IF#2 with the label replaced by the label "C".

Figure 21:
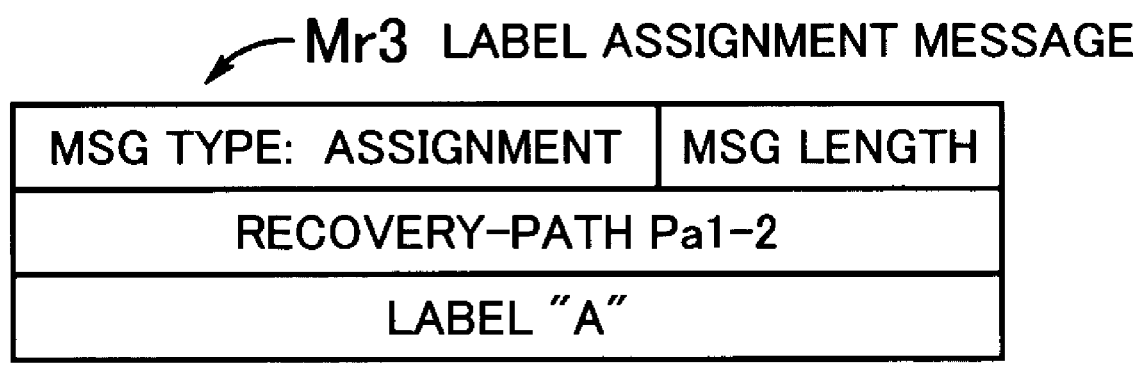
FIG. 21 shows the format of a label assignment message.

FIG. 21 shows a label assignment message Mr3 sent from the node N5 to the node N1. FIG. 22 shows a recovery-path label table managed by the node N5. Since the basic operation of the node N5 is the same as that of the node N6 shown in FIG. 18, a description thereof is omitted.

FIG. 21 shows the format of the label assignment message Mr3. In the message Mr3, the path identifier field is set to the recovery-path Pa1-2, and the label information field is set to the label "A".

FIG. 22 shows a recovery-path label table. To be more specific, the figure shows a recovery-path label table T2 generated and managed by the node N5 after the label assignment message Mr2 is received. The recovery-path label table T2 contains the following data: failure location information, a recovery-path identifier, an input interface, an input label, an output interface, an output label, establishment priority, and maintenance priority.

In the shown table, the input interface is IF#1, the input label is "A", the output interface is IF#2, the output label is "B", the establishment priority is high, and the maintenance priority is low, for all failure location information items related to the recovery-path Pa1-2. (The setup label information for the failure location information of the recovery-path Pa1-1 was described with reference to FIG. 11.)

This means that if a failure occurs in IF#1 of the node N2, IF#1 of the node N3, or IF#1 of the node N4 on the working path P1-2, a packet input from IF#1 with the label "A" added is output from IF#2 with the label replaced by the label "B".

Figure 23:
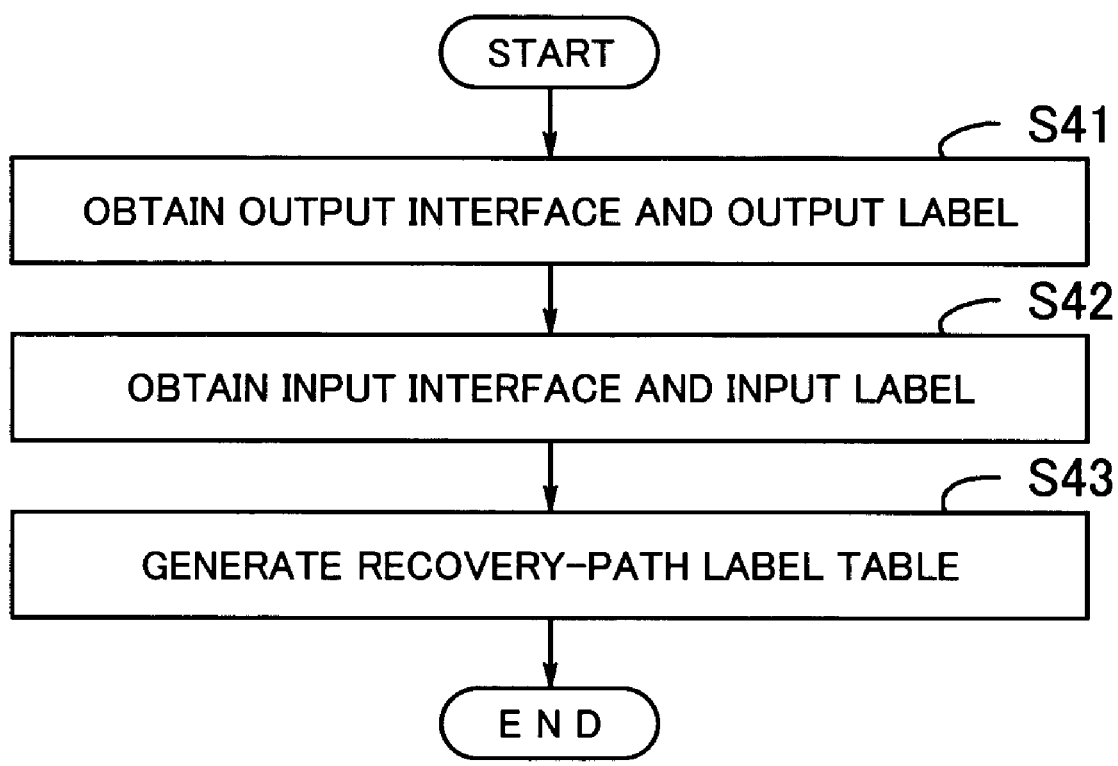
FIG. 23 is a flow chart showing the operation of a node.

The operation of the node N1 receiving the label assignment message Mr3 will next be described. FIG. 23 is a flow chart showing the operation of the node N1.

Step S41: The label assignment message control block 11b of the node N1 receives the label assignment message Mr3. The setup label information generation block 11c sets an interface connecting to the node N5, which has sent the label assignment message, to an output interface IF#3, and assigns the label "A" contained in the label assignment message Mr3 as an output label to the output interface IF#3.

Step S42: The setup label information generation block 11c extracts an input label and an input interface corresponding to the working path P1-2, which are IF#1 and the label AA in this example, from the transit label table t1 shown in FIG. 4.

Step S43: The setup label information generation block 11c adds the input interface, the input label, the output interface, and the output label to a label table, in association with the failure location information. If the recovery-path request message M1 contains establishment priority and maintenance priority, those information items are also added to the label table. A recovery-path label table for the opposite recovery-paths Pa1-1 and Pa1-2 is now generated.

FIG. 24 shows a recovery-path label table. To be more specific, the figure shows the recovery-path label table T1 generated in step S43. The recovery-path label table T1 has the following data: failure location information, a recovery-path identifier, an input interface, an input label, an output interface, an output label, establishment priority, and maintenance priority.

In the shown table, the input interface is IF#1, the input label is AA, the output interface is IF#3, the output label is "A", the establishment priority is high, and the maintenance priority is low, for all failure location information items related to the recovery-path Pa1-2. (The setup label information for the failure location information of the recovery-path Pa1-1 was described earlier with reference to FIG. 8.)

This means that if a failure occurs in IF#1 of the node N2, IF#1 of the node N3, or IF#1 of the node N4, a packet input from IF#1 with the label AA added is output from IF#3 with the label replaced by the label "A".

According to the present invention, one certain node in a network sends a recovery-path request message containing failure location information and recovery-path setup information, and a recovery-path request message and a label assignment message are exchanged between each pair of connected nodes, so that each node can autonomously set up a recovery-path in signaling (communication for label distribution or path setup).

Figure 25:
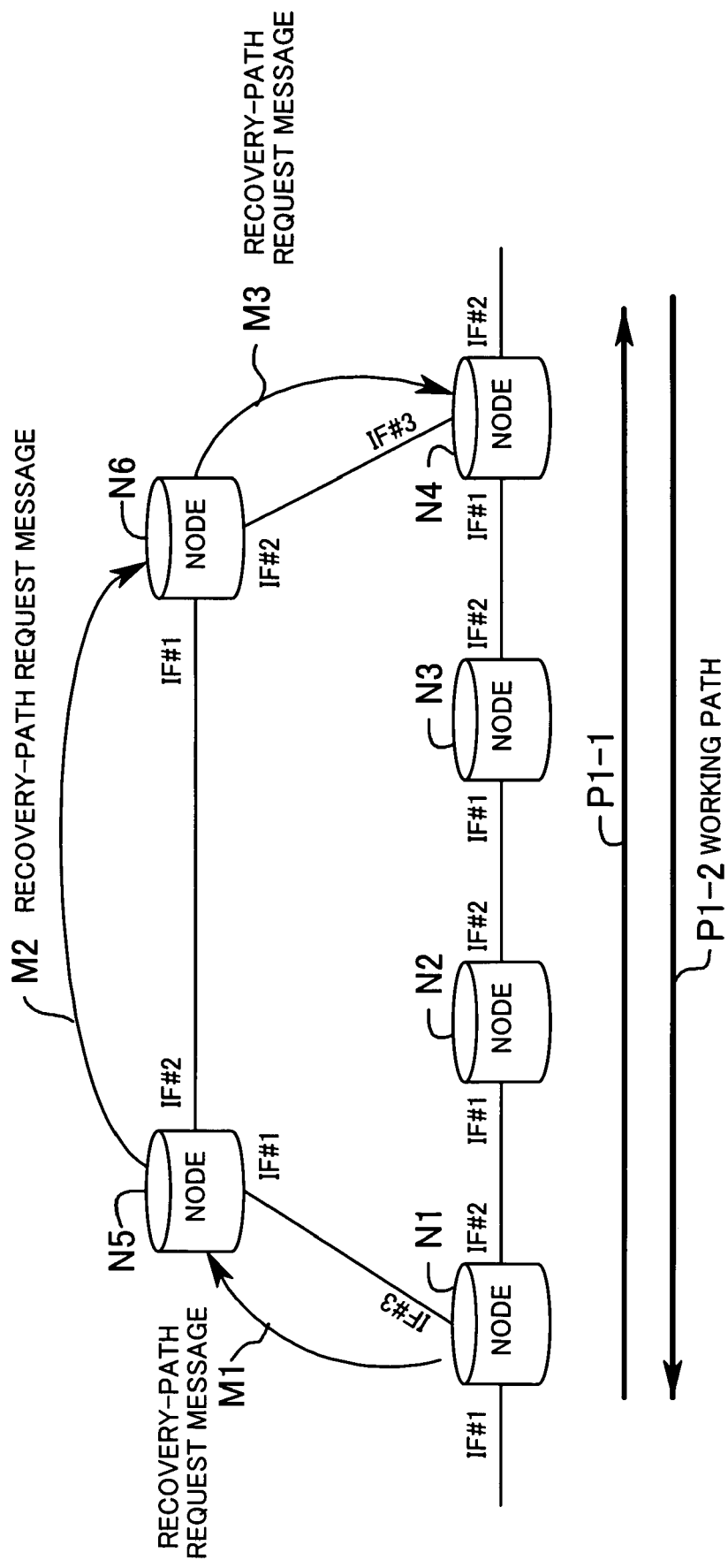
FIG. 25 shows the flow of a recovery-path request message.
Figure 26:
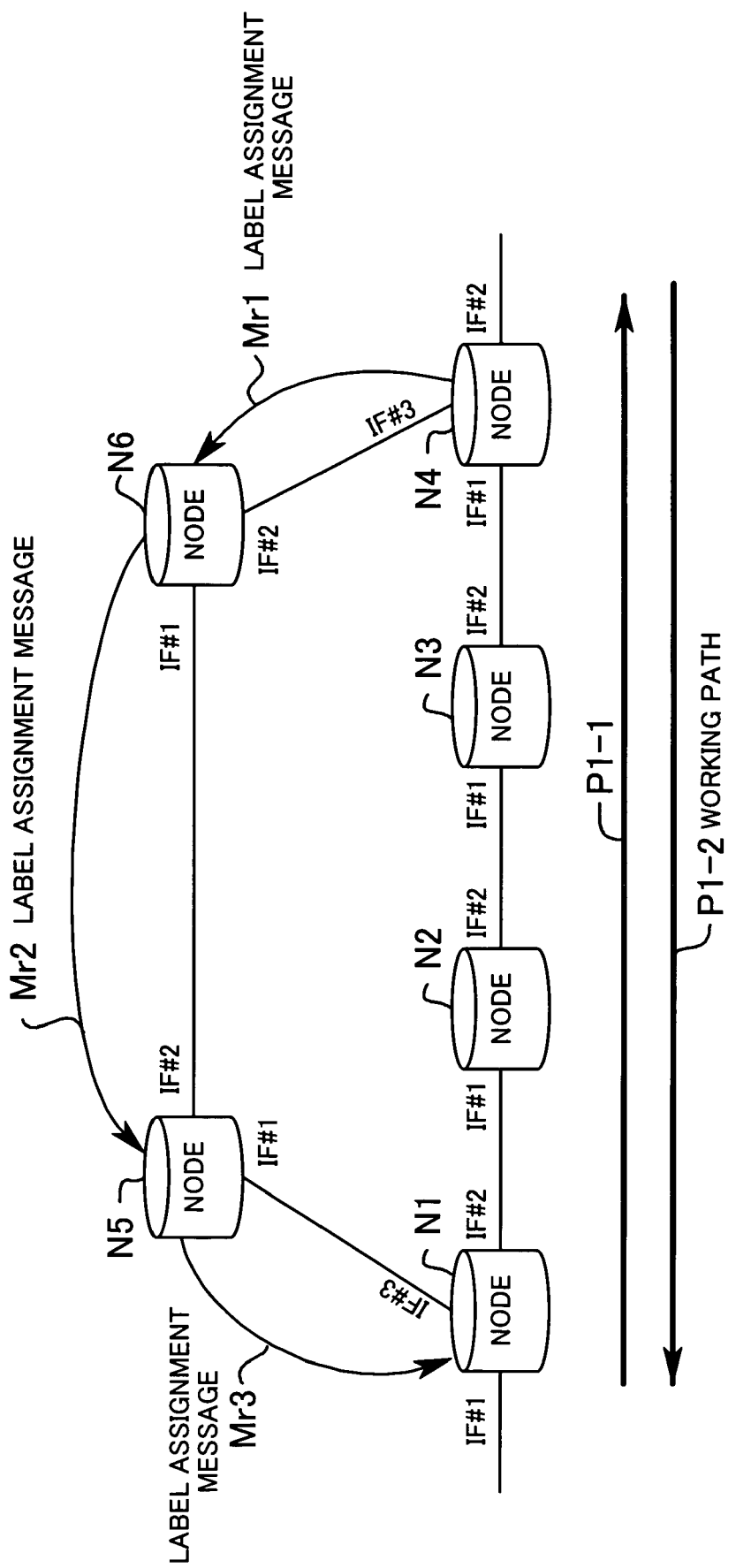
FIG. 26 shows the flow of a label assignment message.

This saves the operator from having to enter failure location information and other information needed to create a recovery-path label table through a network management system (NMS) or a management console for each node. The load on the NMS and the load of maintenance and management on the operator are reduced, and the operability and the convenience can be enhanced. FIG. 25 shows the flow of recovery-path request messages. FIG. 26 shows the flow of label assignment messages.

In the description given above, just either of the upstream and downstream working paths is specified to set up upstream and downstream recovery-paths. A pair of upstream and downstream paths can also be handled as one two-way path identified by a single path identifier. Therefore, a pair of upstream and downstream working paths may be represented by a single path identifier to set up a two-way recovery-path accordingly.

Figure 27:
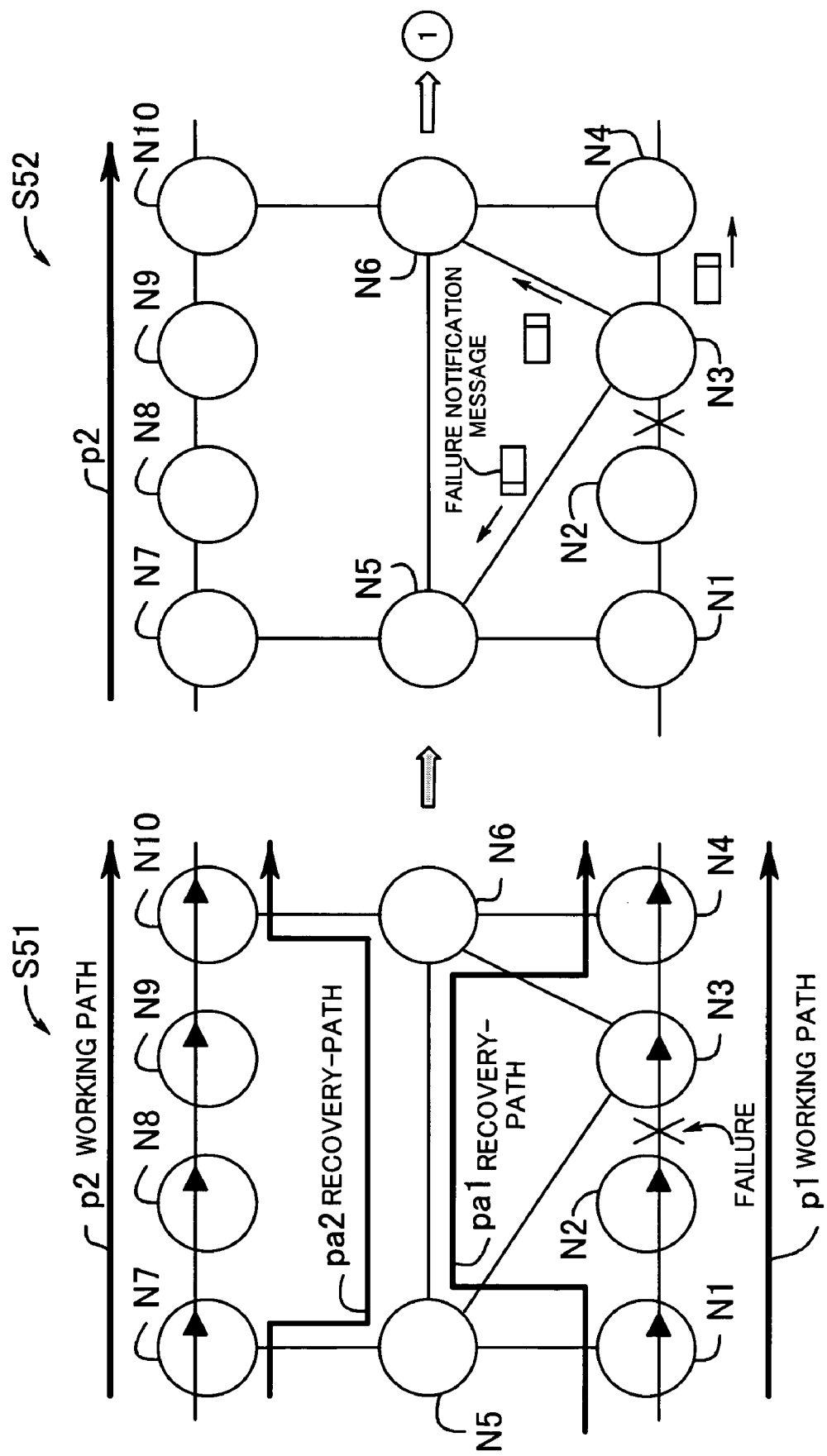
FIG. 27 shows the operation of failure circumvention.
Figure 28:
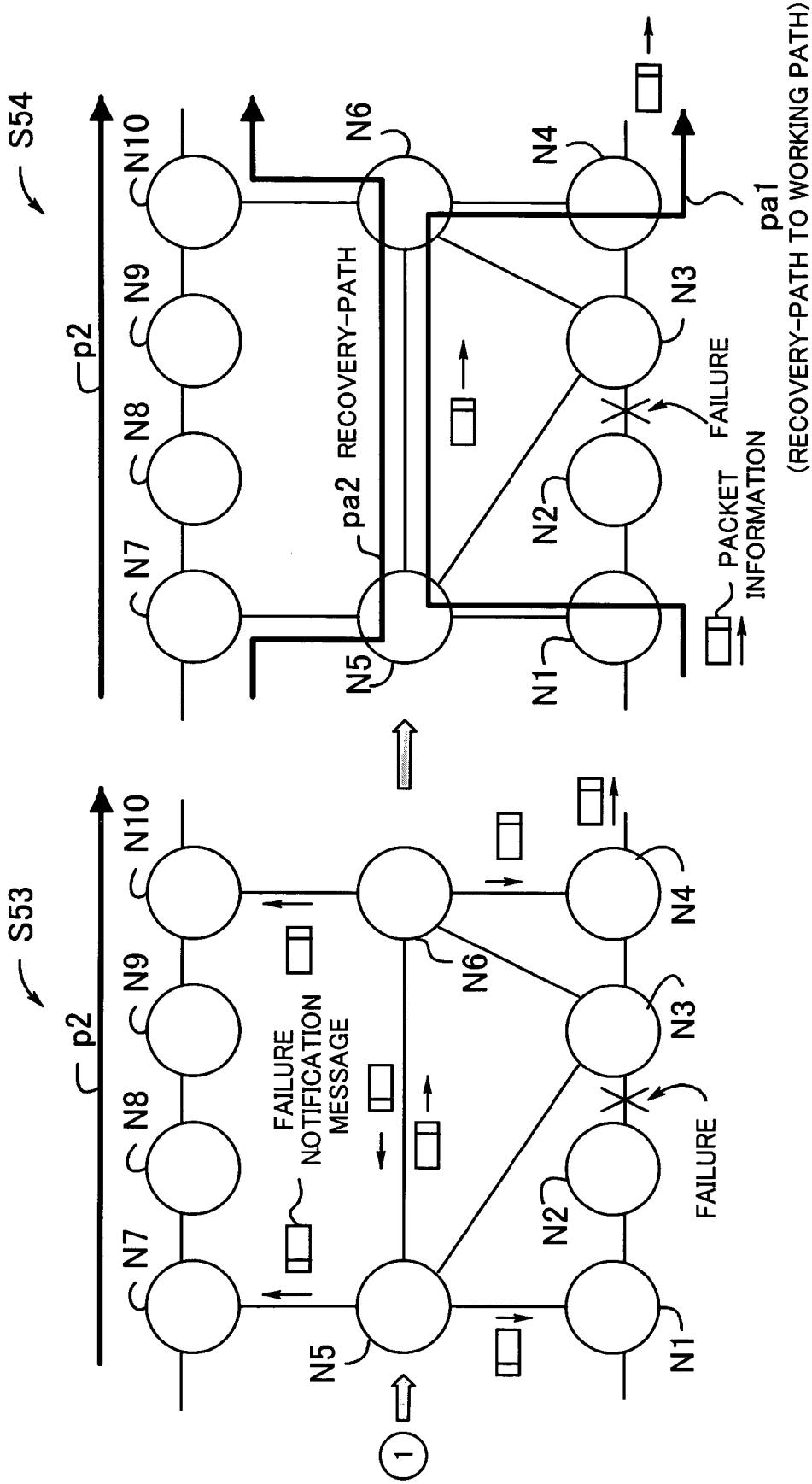
FIG. 28 shows the operation of failure circumvention.

The operation of circumventing a failure after a recovery-path is set up with the above-described control will next be described with reference to FIG. 27 and FIG. 28. FIG. 27 and FIG. 28 show the operation of circumventing a failure. A network has nodes N1 to N10. The nodes N1 to N4 are connected in series, and the nodes N7 to N10 are also connected in series. The node N5 is connected to the nodes N1, N3, N6, and N7, and the node N6 is connected to the nodes N3, N4, N5, and N10.

In this network, a working path p1 has been established through the nodes N1, N2, N3, and N4 in that order. A recovery-path pa1 for the working path p1 has been set up through the nodes N1, N5, N6, and N4 in that order.

Another working path p2 has been established through the nodes N7, N8, N9, and N10 in that order. A recovery-path pa2 for the working path p2 has been set up through the nodes N7, N5, N6, and N10 in that order. The recovery-paths pa1 and pa2 have been set up through the operations described earlier with reference to FIGS. 4 to 26.

In a link between the nodes N5 and N6, the recovery-paths pa1 and pa2 share the same resource. For instance, the paths share a transmission queue in packet transmission, a time slot in the TDM transmission, or an optical wavelength in the WDM transmission.

Supposing that a failure occurs in a link between the nodes N2 and N3, failure circumvention control will be described.

Step S51: A failure occurs in the link between the nodes N2 and N3.

Step S52: An adjacent node detects the failure and transfers a failure notification message containing failure location information to all adjacent nodes. Suppose that the failure detection block 13a of the node N3 downstream from the location of the failure detects the failure, and the failure notification message transfer block 13b of the node N3 transfers the failure notification message to the nodes N4, N5, and N6, which are adjacent nodes.

Step S53: Any node receiving the failure notification message checks whether the message is a new one. If the node determines that the failure notification message is new, the node passes the message to all adjacent nodes connected to this node, excluding the node from which the message is sent. In the shown example, the node N5 passes the failure notification message to the nodes N1, N6, and N7, and the node N6 passes the failure notification message to the nodes N4, N5, and N10.

Step S54: If the failure location information contained in the received failure notification message agrees with any failure location information contained in a recovery-path label table, the setup label information (input interface and input label, and output interface and output label) corresponding to the matching failure location information is selected, and a recovery-path is established accordingly. When the recovery-path establishment block 14 of each node on a recovery-path going around the failure performs this operation, the recovery-path is established, and a failure circumvention control session ends. In the shown example, the nodes N1, N5, N6, and N4 select the setup label information corresponding to the failure location information and establish the recovery-path pa1. Then, the recovery-path pa1 becomes the working path pa1.

Figure 29:
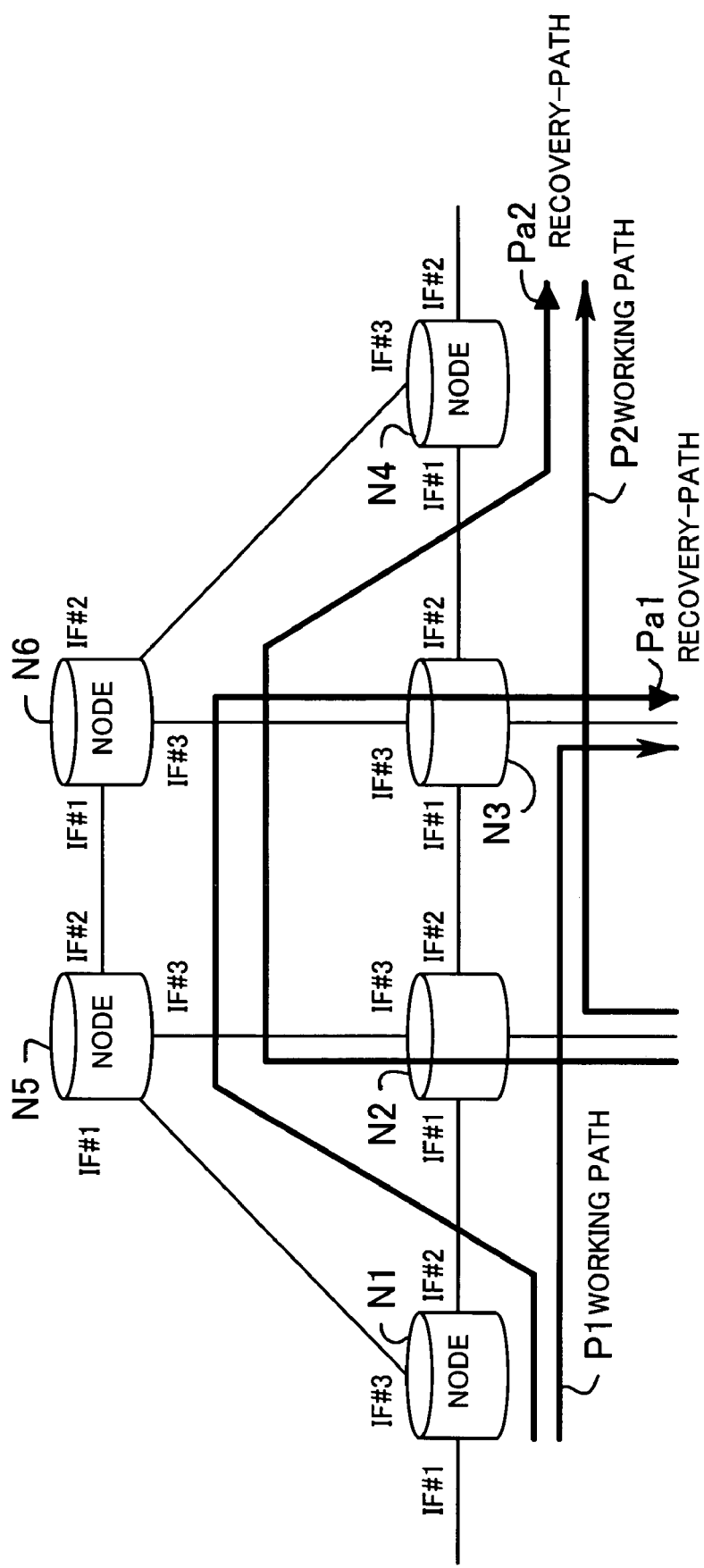
FIG. 29 shows a network where recovery-paths are set up.

Path establishment control according to the present invention performed when a plurality of recovery-paths must be simultaneously established in a single link will next be described. FIG. 29 shows a network where recovery-paths are set up. The network has nodes N1 to N6. The nodes N1 to N4 are connected in series. The nodes N5 and N6 are mutually connected. The node N5 is connected to the nodes N1 and N2, and the node N6 is connected to the nodes N4 and N3.

In this network, a working path P1 has been established through the nodes $N_1$, N2, and N3 in that order, and another working path P2 has been established through the nodes N2, N3, and N4 in that order.

A recovery-path Pa1 for the working path P1 is set up through the nodes N1, N5, N6, and N3 in that order; and another recovery-path Pa2 for the working path P2 is set up through the nodes N2, N5, N6, and N4 in that order. Suppose that a failure occurs in a link between the nodes N2 and N3 in this network.

Figure 30:
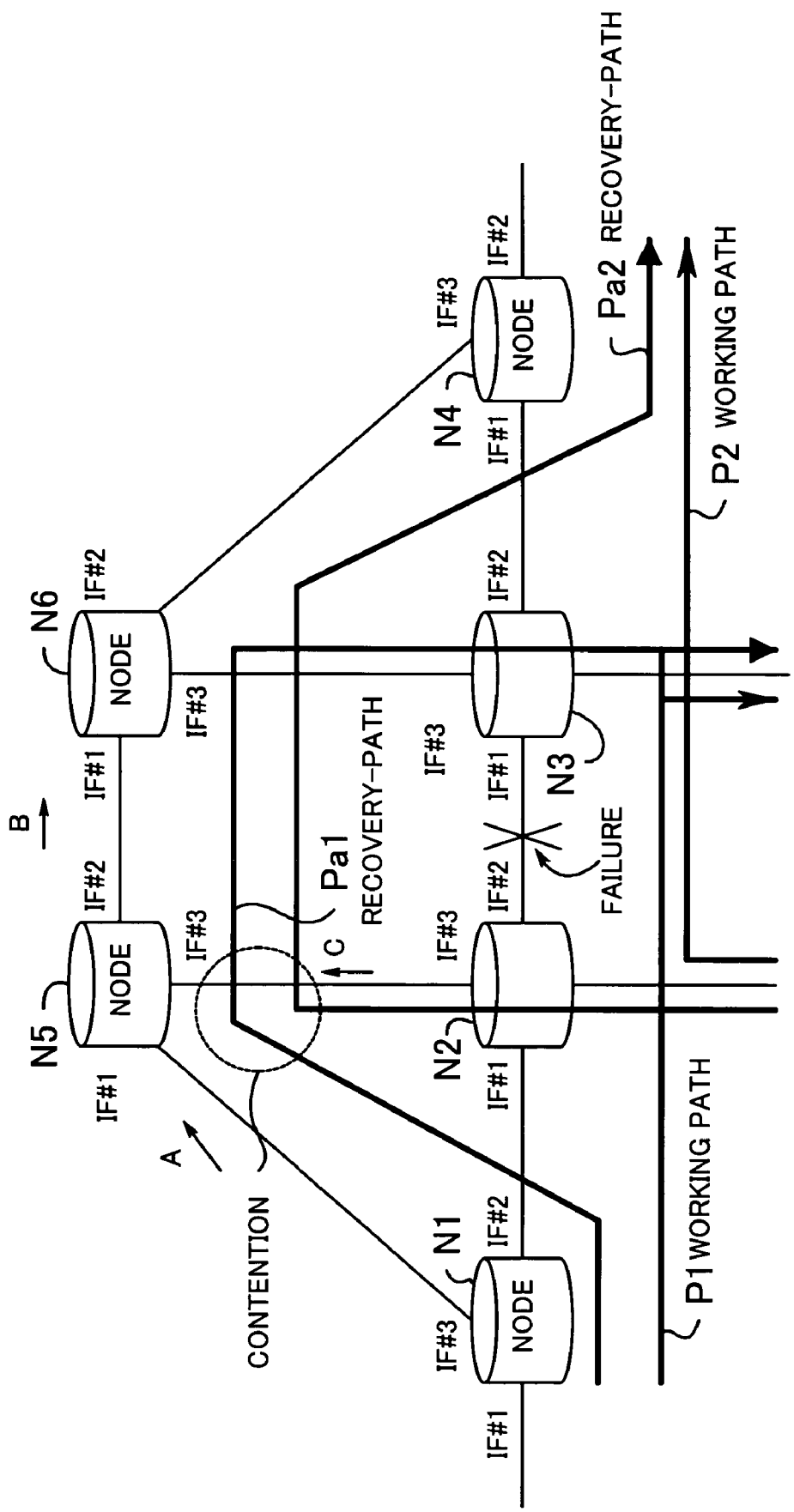
FIG. 30 shows a network where a failure occurs.

FIG. 30 shows that a failure occurs between the nodes N2 and N3 of the network shown in FIG. 29. To circumvent the failure, a recovery-path will be established. But, if the recovery-paths Pa1 and Pa2 are established to circumvent the failure, it would cause contention in the node N5. According to the present invention, recovery-paths can be established without causing this type of contention.

FIG. 31 shows a recovery-path label table T5-1 provided in the node N5. The table T5-1 has the following data: failure location information, a recovery-path identifier, an input interface, an input label, an output interface, an output label, establishment priority, and maintenance priority.

In the shown table, the input interface is IF#1, the input label is "A", the output interface is IF#2, the output label is "B", the establishment priority is high, and the maintenance priority is high, for all the failure location information items related to the recovery-path Pa1.

This means that if a failure occurs in IF#1 of the node N2 or IF#1 of the node N3 on the working path P1, a packet input from IF#1 with the label "A" added is output from IF#2 with the label replaced by the label "B".

In the shown table, the input interface is IF#3, the input label is "C", the output interface is IF#2, the output label is "B", the establishment priority is low, and the maintenance priority is low, for all the failure location information items related to the recovery-path Pa2.

This means that if a failure occurs in IF#1 of the node N3 or IF#1 of the node N4 on the working path P2, a packet input from IF#3 with the label "C" added is output from IF#2 with the label replaced by the label "B".

Figure 32:
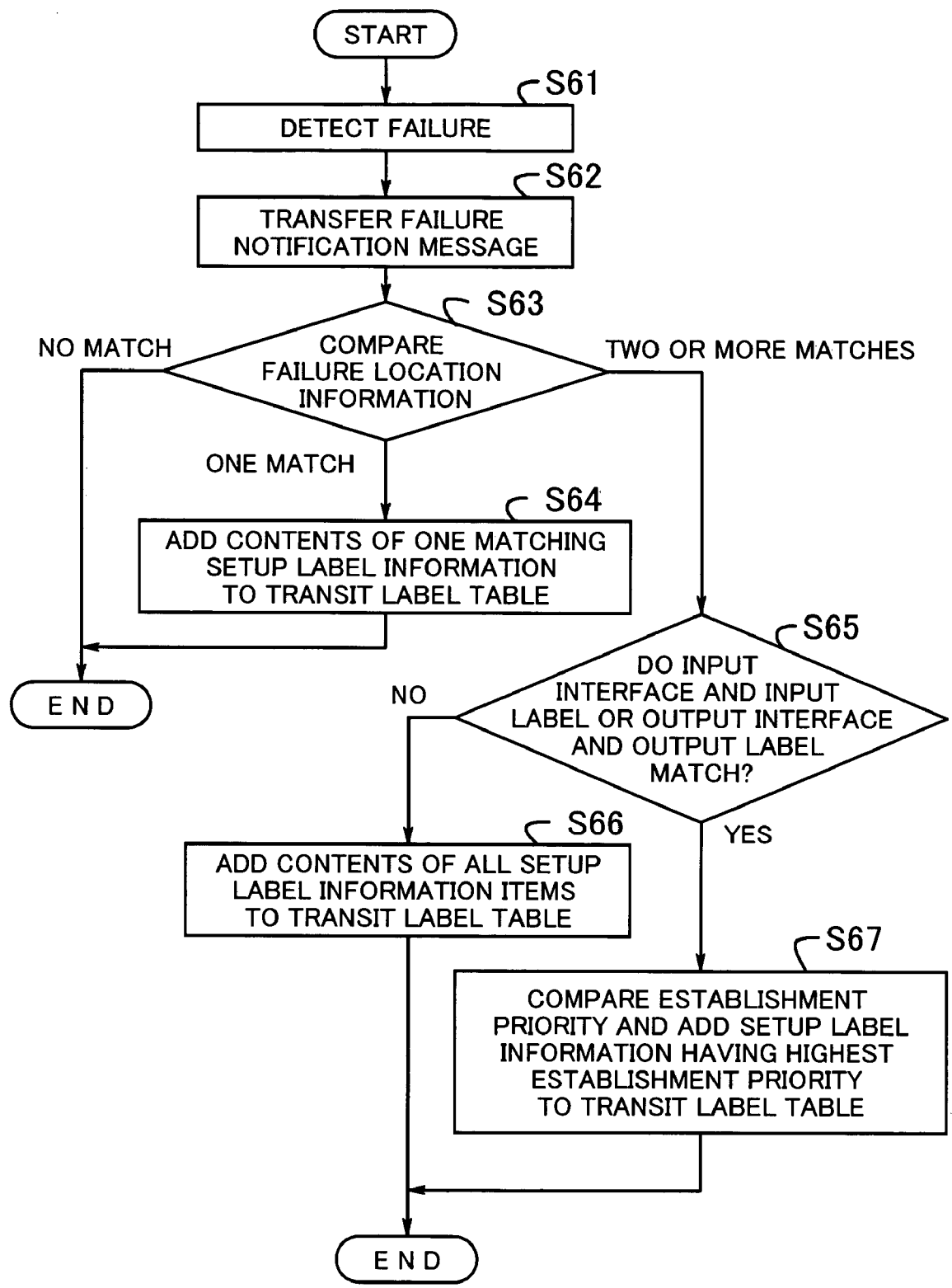
FIG. 32 is a flow chart showing the operation until a recovery-path is established.

The operation for establishing a recovery-path in the case described above will next be described. FIG. 32 is a flow chart showing the operation until a recovery-path is established.

Step S61: The node N3 at the lower end of the link where the failure occurs detects the failure and broadcasts a failure notification message containing failure location information (IF#1 of node N3) in order to report the occurrence of the failure.

Step S62: All the nodes in the network receive the failure notification message and operate accordingly. The operation of just the node N5 will be described here. The node N5 checks whether the received failure notification message is a new one. If the node N5 determines that the failure notification message is new, the node N5 passes the failure notification message to all adjacent nodes.

Step S63: The failure notification message transfer block 13b of the node N5 receives the failure notification message containing the failure location information (IF#1 of node N3) sent from the node N3. The recovery-path establishment block 14 searches through the recovery-path label table T5-1 shown in FIG. 31 for the same failure location information. If matching failure location information is not found, the recovery-path establishment block 14 does nothing. If one matching failure location information item is found, the operation proceeds to step S64. If two or more matching failure location information items are found, the operation proceeds to step S65.

Step S64: If one matching failure location information item is found, the item is added to a transit label table.

Step S65: If two or more matching failure location information items are found, it is checked whether the input interface and the input label or the output interface and the output label match. If the items do not match, the operation proceeds to step S66. If the items match, the operation proceeds to step S67.

Step S66: If the input interface and input label or the output interface and output label do not match, all those items are added to the transit label table.

Step S67: If the input interface and input label or the output interface and output label match, the items are compared in terms of establishment priority. An item with the highest establishment priority level is stored. If a plurality of information items has the highest establishment priority level, an item with the lowest recovery-path ID is stored.

In the recovery-path label table T5-1 shown in FIG. 31, the items C1 and C2 match in terms of the output interface and the output label. The item C1 of the recovery-path Pa1 has higher establishment priority than the item C2, so that the recovery-path establishment block 14 of the node N5 selects and establishes the recovery-path Pa1. FIG. 33 shows a transit label table. Because the recovery-path Pa1 becomes a working path, the information of the item C1 is included in the transit label table t5-1.

Figure 34:
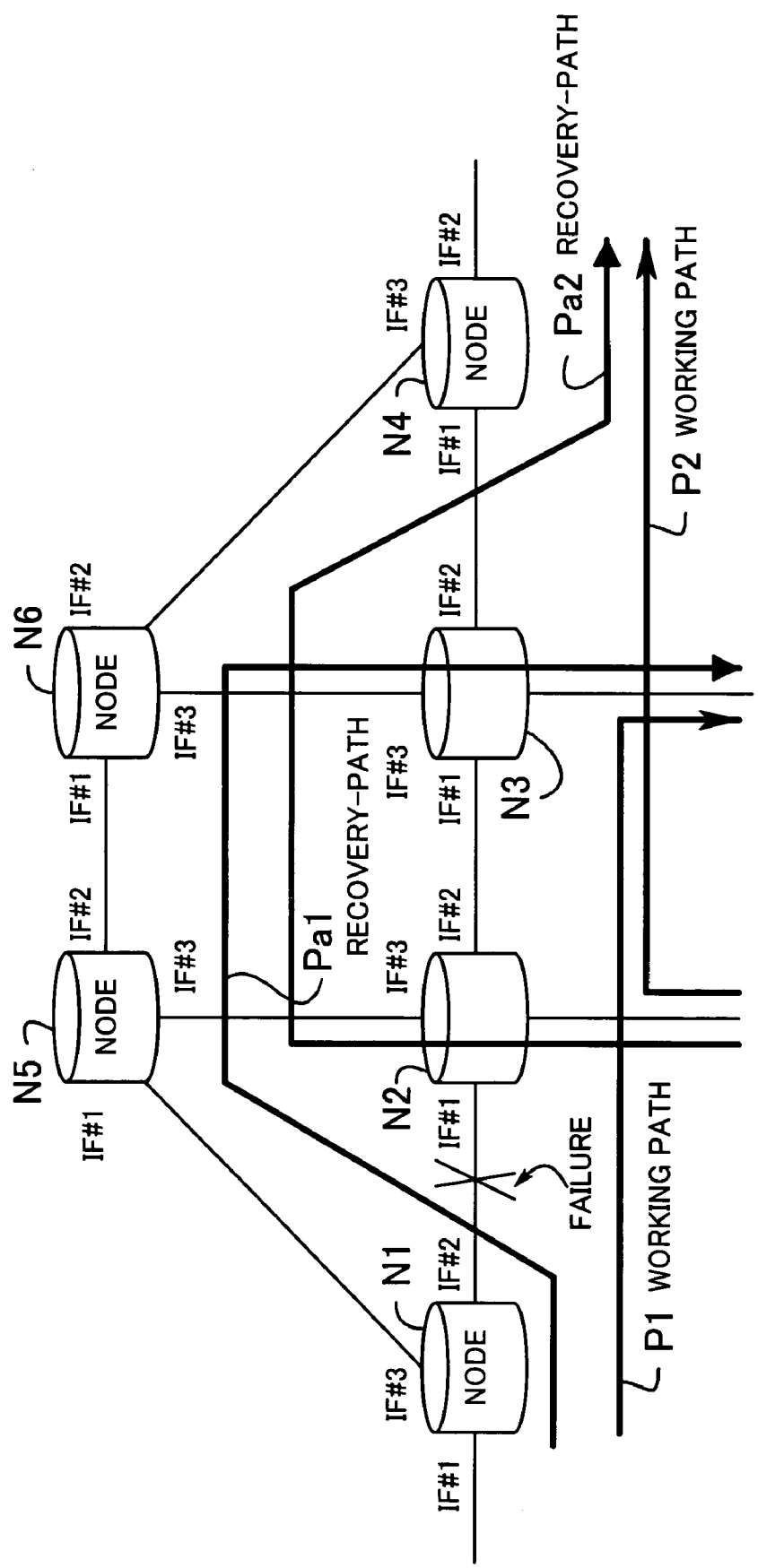
FIG. 34 shows a network where a single failure is circumvented.

Path establishment control according to the present invention performed when a new recovery-path must be established for a link of an already-established recovery-path will be described. FIG. 34 shows that a single failure occurring in a link between the nodes N1 and N2 in the network shown in FIG. 29 is circumvented. A recovery-path Pa1 has been established. Suppose that another failure occurs between the nodes N3 and N4 in the network.

Figure 35:
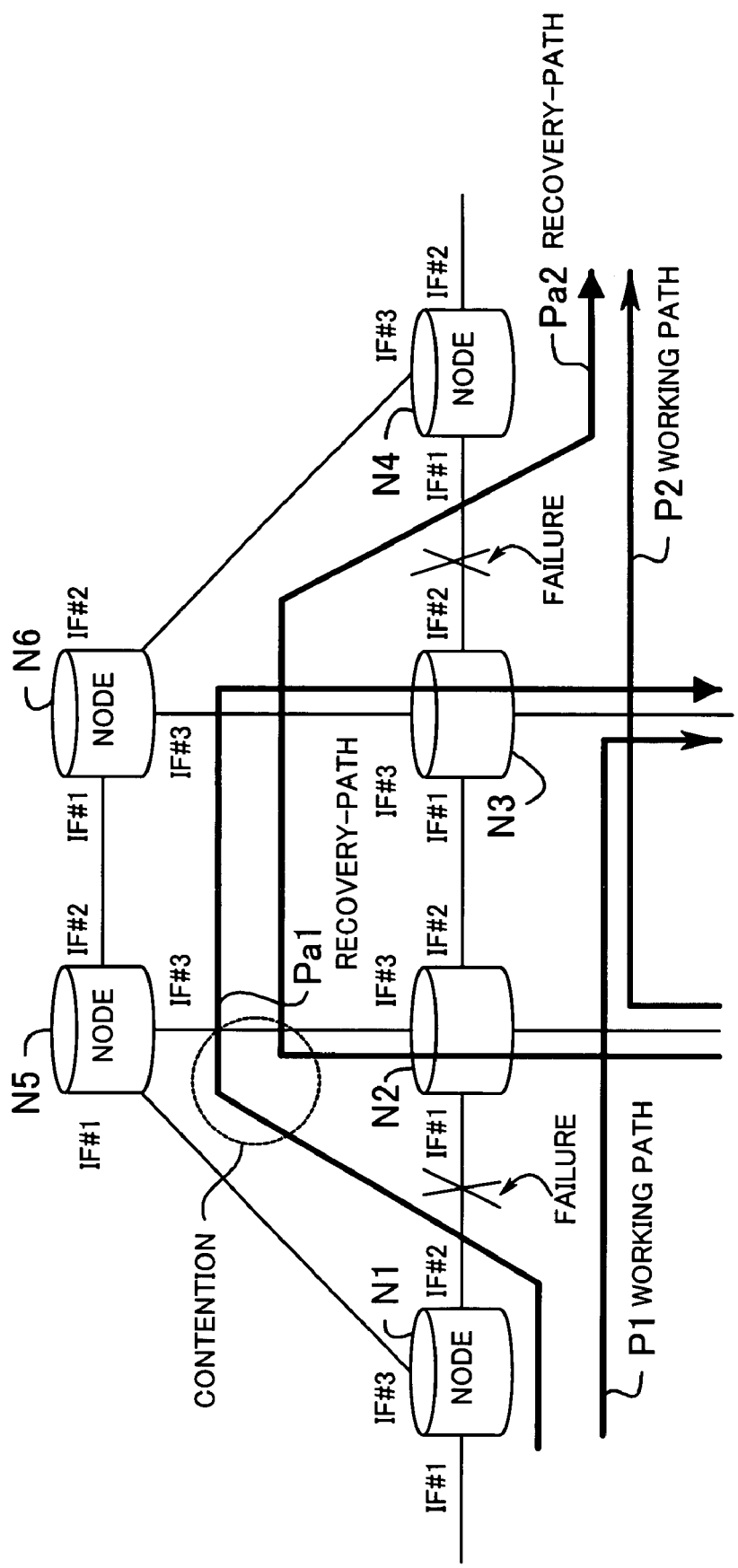
FIG. 35 shows a network where a failure occurs.

FIG. 35 shows that a failure is occurring between the nodes N3 and N4 in the network shown in FIG. 34. A recovery-path Pa2 must be established to circumvent the failure, but the recovery-path Pa2 and the already-established recovery-path Pa1 would cause contention. According to the present invention, a recovery-path can be established without causing this type of contention. For the sake of convenience, FIG. 36 shows the recovery-path label table T5-1 of the node N5 shown in FIG. 31 and the transit label table t5-1 shown in FIG. 33.

Figure 37:
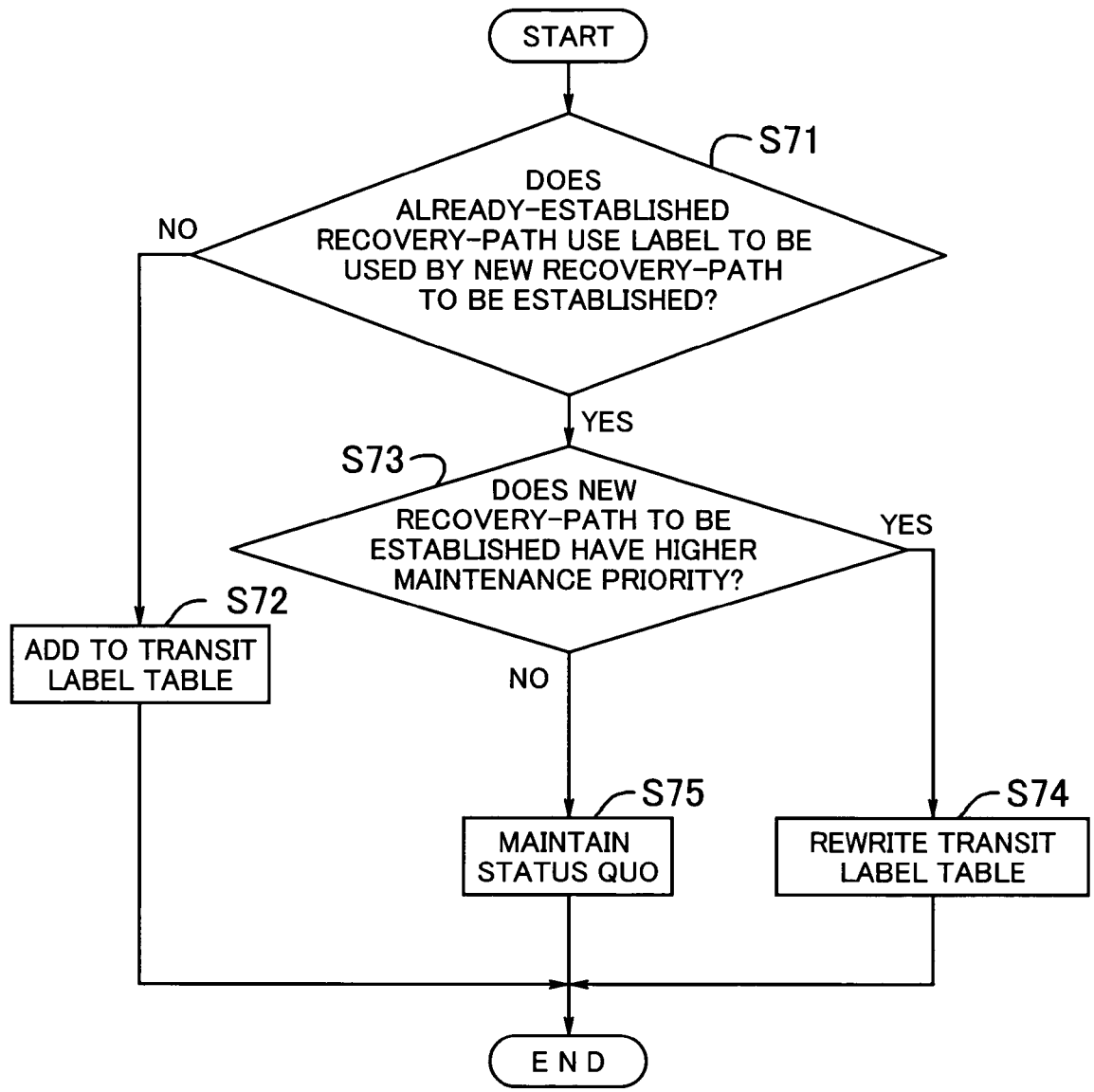
FIG. 37 is a flow chart showing the operation until a recovery-path is established.
Figure 39:
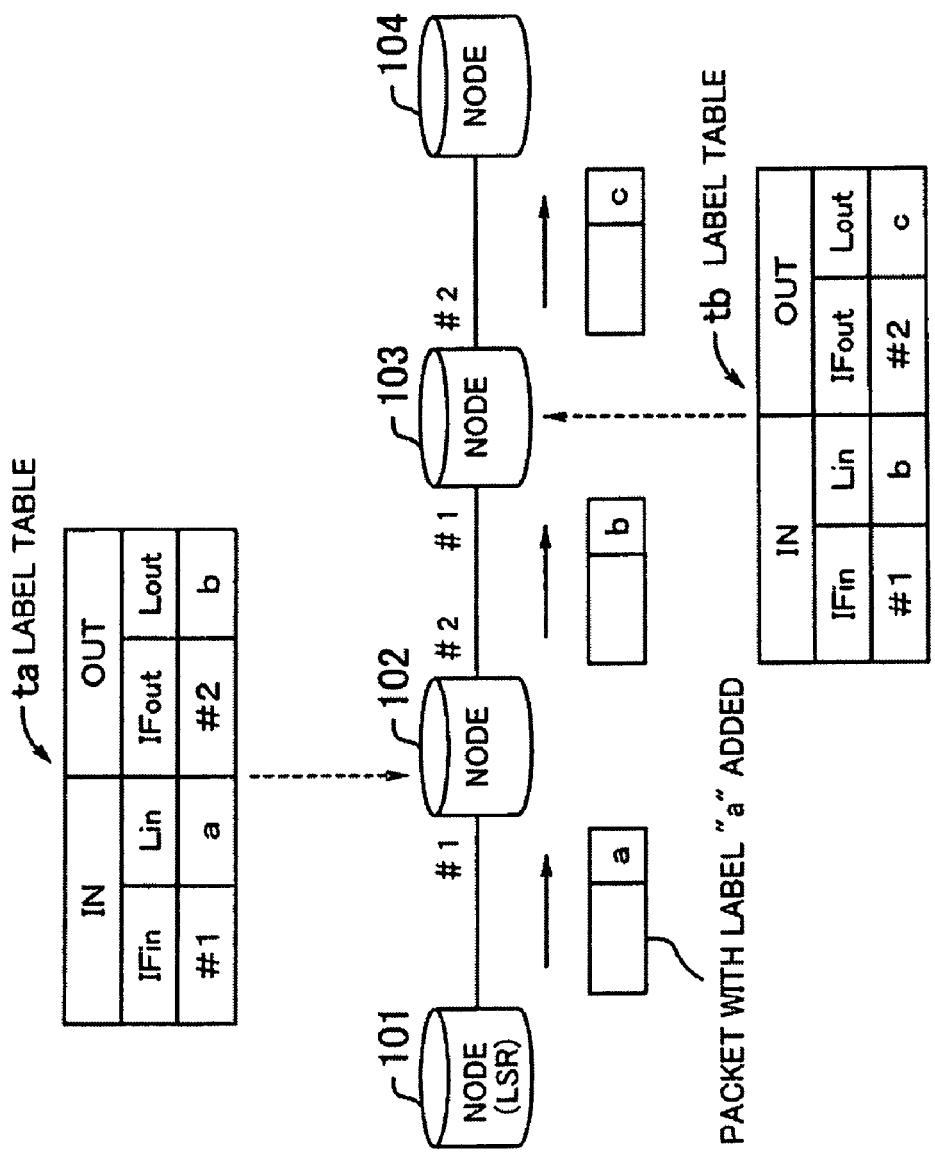
FIG. 39 shows an overview of GMPLS packet transmission.

The operation for establishing a recovery-path will next be described. FIG. 37 is a flow chart showing the operation until a recovery-path is established.

Step S71: It is checked whether an already-established recovery-path uses a label to be used by a new recovery-path to be established. (In a packet network, a resource is checked instead of a label because different labels may use the resource such as a transmission queue.) If the label is not used, the operation proceeds to step S72. If the label is used, the operation proceeds to step S73.

Step S72: If the label is not used, the setup label information of the recovery-path to be established is added to a transit label table.

Step S73: If the label is used, the already-existing recovery-path and the new recovery-path to be established are compared in terms of maintenance priority. If the latter recovery-path has higher maintenance priority, the operation proceeds to step S74. If the latter recovery-path has lower maintenance priority, the operation proceeds to step S75.

Step S74: If the latter recovery-path has higher maintenance priority, the setup information of the already-established recovery-path is deleted from the transit label table, and the setup information of the new recovery-path to be established is added instead.

Step S75: If the recovery-path to be established has lower maintenance priority, the recovery-path is not set up (the status quo is maintained).

In the shown example, the items C3 and C4 of the recovery-path label table T5-1 shown in FIG. 36 are compared in terms of maintenance priority. The item C3 related to the recovery-path Pa1 has higher maintenance priority, so that the recovery-path establishment block 14 of the node N5 keeps the recovery-path Pa1 and does not establish the recovery-path Pa2.

If the maintenance priority of the recovery-path Pa2 is higher than that of the recovery-path Pa1, the setup label information of the recovery-path Pa2 is added to the transit label table. FIG. 38 shows the transit label table. If the recovery-path Pa2 has higher maintenance priority than the recovery-path Pa1, the recovery-path Pa2 becomes a working path, and the item C4 is added to the transit label table t5-2 with the maintenance priority changed to high.

As described above, according to the present invention, when a recovery-path request is made to one certain node such as a starting node of a recovery-path, a recovery-path can be automatically set up and the recovery-path can be automatically associated with failure locations, at all nodes on the recovery-path. This eliminates the need for specifying a recovery-path in each node from the NMS or management console. The time and load of specification can be reduced.

Even if a plurality of paths fight for the same resource when one or more failures occur, an appropriate recovery-path can be: selected, and high-speed failure recovery can be implemented.

The application of the present invention to label switching of packet transmission has been mainly described. The present invention can also be applied to GMPLS of TDM transmission by using a time slot as a label and to GMPLS of WDM transmission by using a wavelength as a label.

As has been described above, the transmission apparatus according to the present invention generates, sends, and receives a recovery-path request message which contains failure location information indicating a location where a failure can occur and recovery-path setup information for setting up a recovery-path used for failure recovery and a label assignment message as a response to the recovery-path request message; generates a recovery-path label table in accordance with the setup label information; establishes a recovery-path by comparing the failure location information contained in a failure notification message and failure location information contained in the recovery-path label table and by selecting setup label information corresponding to any matching failure location information. Because a recovery-path can be established efficiently at a high speed for failure recovery, the transmission quality and the reliability can be enhanced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission apparatus for performing signal transmission based on label switching while performing failure circumvention control, the transmission apparatus comprising:
   a label distribution control block including:
      a recovery-path request message control block to generate, send, and receive, before any failure occurs on a working path of a network, a recovery-path request message containing failure location information specifying which node or link on the working path is to be protected from failure and recovery-path setup information for setting up a recovery-path for failure recovery;
      a label assignment message control block a label assignment message as a response to the recovery-path request message; and
      a setup label information generation block to generate setup label information for label switching, in accordance with the recovery-path request message and the label assignment message, the setup label information containing:
      input information including an input interface identifier indicating a path to which data is input, and an input label for the input data,
      output information including an output interface identifier indicating a path from which data should be output, and an output label for the output data,
      establishment priority indicating establishment precedence given to a plurality of recovery-paths, and
      maintenance priority indicating maintenance precedence given to a plurality of recovery-paths;
   a recovery-path label table management block to construct and manage a recovery-path label table containing failure location information and setup label information;
   a failure notification block including:
      a failure detection block to detect a location of a failure that has occurred; and
      a failure notification message transfer block to transfer a failure notification message containing the failure location information of the failure; and
   a recovery-path establishment block to establish a recovery-path by comparing the failure location information contained in the failure notification message and the failure location information contained in the recovery-path label table and by selecting a setup label information item having the highest establishment priority if a plurality of recovery-paths must be simultaneously established in a single link and if the recovery-path label table contains a plurality of information items matching the failure location information contained in the failure notification message.

2. The transmission apparatus according to claim 1, wherein the recovery-path request message control block includes a share flag indicating whether a resource is shared in a recovery-path request message when a recovery-path is set up.

3. A transmission apparatus for performing signal transmission based on label switching while performing failure circumvention control, the transmission apparatus comprising:
   a label distribution control block including:
      a recovery-path request message control block to generate, send, and receive, before any failure occurs on a working path of a network, a recovery-path request message containing failure location information specifying which node or link on the working path is to be protected from failure and recovery-path setup information for setting up a recovery-path for failure recovery;
      a label assignment message control block a label assignment message as a response to the recovery-path request message; and
      a setup label information generation block to generate setup label information for label switching, in accordance with the recovery-path request message and the label assignment message, the setup label information containing:
      input information including an input interface identifier indicating a path to which data is input, and an input label for the input data,
      output information including an output interface identifier indicating a path from which data should be output, and an output label for the output data,
      establishment priority indicating establishment precedence given to a plurality of recovery-paths, and
      maintenance priority indicating maintenance precedence given to a plurality of recovery-paths;
   a recovery-path label table management block to construct and manage a recovery-path label table containing failure location information and setup label information;
   a failure notification block including:
      a failure detection block to detect a location of a failure that has occurred; and
      a failure notification message transfer block to transfer a failure notification message containing the failure location information of the failure; and
   a recovery-path establishment block to establish a recovery-path by comparing the failure location information contained in the failure notification message and the failure location information contained in the recovery-path label table and by selecting a setup label information item having the highest maintenance priority if a recovery-path must be established in a link of an already-established recovery-path and if the recovery-path label table contains a plurality of information items matching the failure location information contained in the failure notification message.

4. The transmission apparatus according to claim 3, wherein the recovery-path request message control block includes a share flag indicating whether a resource is shared in a recovery-path request message when a recovery-path is set up.

5. A transmission apparatus for performing signal transmission based on label switching while performing failure circumvention control, the transmission apparatus comprising:
   a label distribution control block including:
      a recovery-path request message control block to generate, send, and receive, before any failure occurs on a working path of a network, a recovery-path request message containing failure location information specifying which node or link on the working path is to be protected from failure and recovery-path setup information for setting up a recovery-path for failure recovery;
      a label assignment message control block a label assignment message as a response to the recovery-path request message; and
      a setup label information generation block to generate setup label information for label switching, in accordance with the recovery-path request message and the label assignment message, the setup label information containing:

input information including an input interface identifier indicating a path to which data is input, and an input label for the input data, output information including an output interface identifier indicating a path from which data should be output, and an output label for the output data, establishment priority indicating establishment precedence given to a plurality of recovery-paths, and maintenance priority indicating maintenance precedence given to a plurality of recovery-paths;

a recovery-path label table management block to construct and manage a recovery-path label table containing failure location information and setup label information;

a failure notification block including:

a failure detection block to detect a location of a failure that has occurred; and a failure notification message transfer block to transfer a failure notification message containing the failure location information of the failure; and a recovery-path establishment block to establish a recovery-path by comparing the failure location information contained in the failure notification message and the failure location information contained in the recovery-path label table and by selecting setup label information corresponding to any matching failure location information;

wherein the setup label information generation block included in a node where a working path and a recovery-path meet generates setup label information by associating the output interface identifier of the working path and the output label with the input interface identifier of the recovery-path and the input label or by associating the input interface identifier of the working path and the input label with the output interface identifier of the recovery-path and the output label.

6. The transmission apparatus according to claim 5, wherein the recovery-path request message control block includes a share flag indicating whether a resource is shared in a recovery-path request message when a recovery-path is set up.

7. A failure circumvention method for circumventing a failure on a generalized multi-protocol label switching (GM-PLS) network, the failure circumvention method comprising:

generating, in a node in the network, failure location information specifying which node or link on a working path of the network is to be protected from failure;

sending and receiving, before any failure occurs on the working path of the network, a recovery-path request message containing failure location information and recovery-path setup information used to set up a recovery-path for failure recovery, between nodes;

sending and receiving a label assignment message as a response to the recovery-path request message, between nodes;

generating setup label information for label switching in accordance with the recovery-path request message and the label assignment message, the setup label information containing:

input information including an input interface identifier indicating a path to which data is input, and an input label for the input data, output information including an output interface identifier indicating a path from which data should be output, and an output label for the output data, establishment priority indicating establishment precedence given to a plurality of recovery-paths, and maintenance priority indicating maintenance precedence given to a plurality of recovery-paths;

constructing and managing a recovery-path label table containing failure location information and setup label information;

detecting the location of a failure that has occurred using a node close to the failure;

transferring a failure notification message containing the failure location information of the failure, between nodes; and establishing a recovery-path by comparing the failure location information contained in the failure notification message and the failure location information contained in the recovery-path label table and by selecting a setup label information item having the highest establishment priority, if a plurality of recovery-paths must be simultaneously established in a single link and if the recovery-path label table contains a plurality of information items matching the failure location information contained in the failure notification message.

8. The failure circumvention method according to claim 7, wherein a recovery-path request message includes a share flag indicating whether a resource is shared when a recovery-path is set up.

9. A failure circumvention method for circumventing a failure on a generalized multi-protocol label switching (GM-PLS) network, the failure circumvention method comprising:

generating, in a node in the network, failure location information specifying which node or link on a working path of the network is to be protected from failure;

sending and receiving, before any failure occurs on the working path of the network, a recovery-path request message containing the failure location information and recovery-path setup information used to set up a recovery-path for failure recovery, between nodes;

sending and receiving a label assignment message as a response to the recovery-path request message, between nodes;

generating setup label information for label switching in accordance with the recovery-path request message and the label assignment message, the setup label information containing:

input information including an input interface identifier indicating a path to which data is input, and an input label for the input data, output information including an output interface identifier indicating a path from which data should be output, and an output label for the output data, establishment priority indicating establishment precedence given to a plurality of recovery-paths, and maintenance priority indicating maintenance precedence given to a plurality of recovery-paths;

constructing and managing a recovery-path label table containing failure location information and setup label information;

detecting the location of a failure that has occurred using a node close to the failure;

transferring a failure notification message containing the failure location information of the failure, between nodes; and establishing a recovery-path by comparing the failure location information contained in the failure notification message and the failure location information contained in the recovery-path label table and by selecting a setup label information item having the highest maintenance priority, if a recovery-path must be established in a link of an already-established recovery-path and if the recovery-path label table contains a plurality of information items matching the failure location information contained in the failure notification message.

10. The failure circumvention method according to claim 9, wherein a recovery-path request message includes a share flag indicating whether a resource is shared when a recovery-path is set up.

11. A failure circumvention method for circumventing a failure on a generalized multi-protocol label switching (GMPLS) network, the failure circumvention method comprising:

generating, in a node in the network, failure location information specifying which node or link on a working path of the network is to be protected from failure;

sending and receiving, before any failure occurs on the working path of the network, a recovery-path request message containing the failure location information and recovery-path setup information used to set up a recovery-path for failure recovery, between nodes;

sending and receiving a label assignment message as a response to the recovery-path request message, between nodes;

generating setup label information for label switching in accordance with the recovery-path request message and the label assignment message, the setup label information containing:

input information including an input interface identifier indicating a path to which data is input, and an input label for the input data, output information including an output interface identifier indicating a path from which data should be output, and an output label for the output data, establishment priority indicating establishment precedence given to a plurality of recovery-paths, and maintenance priority indicating maintenance precedence given to a plurality of recovery-paths;

constructing and managing a recovery-path label table containing failure location information and setup label information;

detecting the location of a failure that has occurred using a node close to the failure;

transferring a failure notification message containing the failure location information of the failure, between nodes;

establishing a recovery-path by comparing the failure location information contained in the failure notification message and the failure location information contained in the recovery-path label table and by selecting setup label information corresponding to any matching failure location information using a node receiving the failure notification message; and generating, in a node where a working path and a recovery-path meet, setup label information by associating the output interface identifier of the working path and the output label with the input interface identifier of the recovery-path and the input label or by associating the input interface identifier of the working path and the input label with the output interface identifier of the recovery-path and the output label.

12. The failure circumvention method according to claim 11, wherein a recovery-path request message includes a share flag indicating whether a resource is shared when a recovery-path is set up.

* * * * *